(12) United States Patent
Shimizu et al.

(10) Patent No.: US 10,125,309 B2
(45) Date of Patent: Nov. 13, 2018

(54) PHOTOCHROMIC COMPOSITION

(71) Applicant: TOKUYAMA CORPORATION, Shunan-shi, Yamaguchi (JP)

(72) Inventors: Yasutomo Shimizu, Shunan (JP); Katsuhiro Mori, Shunan (JP); Junji Momoda, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 230 days.

(21) Appl. No.: 15/025,115

(22) PCT Filed: Nov. 7, 2014

(86) PCT No.: PCT/JP2014/079560
§ 371 (c)(1),
(2) Date: Mar. 25, 2016

(87) PCT Pub. No.: WO2015/068798
PCT Pub. Date: May 14, 2015

(65) Prior Publication Data
US 2016/0222285 A1    Aug. 4, 2016

(30) Foreign Application Priority Data

Nov. 11, 2013   (JP) .................................. 2013-232830
Nov. 12, 2013   (JP) .................................. 2013-234153

(51) Int. Cl.
*C09K 9/02*      (2006.01)
*C08F 290/10*    (2006.01)
(Continued)

(52) U.S. Cl.
CPC .................. *C09K 9/02* (2013.01); *B32B 7/12* (2013.01); *C08F 290/10* (2013.01);
(Continued)

(58) Field of Classification Search
CPC .. G02B 5/23; G02C 7/102; C08L 5/16; C08G 83/007; C08B 37/0015; C08B 37/0012
See application file for complete search history.

(56) References Cited

U.S. PATENT DOCUMENTS 6,828,378 B2 * 12/2004 Okumura ............... A61K 47/40
                                                525/403
2002/0090348 A1 * 7/2002 Khoshdel ............... A61K 8/738
                                                424/70.11
(Continued)

FOREIGN PATENT DOCUMENTS

EP      1 283 218 A1    2/2003
EP      1 433 814 A1    6/2004
(Continued)

OTHER PUBLICATIONS

Extended European Search Report, dated Jun. 22, 2017, for counterpart European Application No. 14859834.5.
(Continued)

*Primary Examiner* — Michael A Salvitti
(74) *Attorney, Agent, or Firm* — Birch, Stewart, Kolasch & Birch, LLP

(57) ABSTRACT

A photochromic composition comprising (A) a polyrotaxane having a composite molecular structure composed of an axial molecule and a plurality of cyclic molecules clathrating the axial molecule and (B) a photochromic compound.

17 Claims, 1 Drawing Sheet

(51) Int. Cl.
- C08F 299/00 (2006.01)
- C08L 71/02 (2006.01)
- B32B 7/12 (2006.01)
- G02B 5/23 (2006.01)
- G02C 7/10 (2006.01)
- C08G 83/00 (2006.01)

(52) U.S. Cl.
CPC ............ *C08F 299/00* (2013.01); *C08L 71/02* (2013.01); *G02B 5/23* (2013.01); *G02C 7/102* (2013.01); *B32B 2250/02* (2013.01); *B32B 2255/26* (2013.01); *B32B 2305/72* (2013.01); *B32B 2307/40* (2013.01); *B32B 2307/412* (2013.01); *B32B 2551/00* (2013.01); *C08G 83/007* (2013.01); *G02C 2202/16* (2013.01)

(56) References Cited

U.S. PATENT DOCUMENTS

| | | | |
|---|---|---|---|
| 2003/0138398 A1* | 7/2003 | Okumura | A61K 47/40 424/78.38 |
| 2004/0220292 A1 | 11/2004 | Momoda et al. | |
| 2009/0202461 A1* | 8/2009 | Rodriguez | A61K 8/738 424/63 |
| 2009/0312490 A1* | 12/2009 | Ito | C08B 37/0015 525/54.2 |
| 2010/0047200 A1* | 2/2010 | Luukas | A61K 8/0229 424/64 |
| 2010/0230650 A1 | 9/2010 | Nagoh et al. | |
| 2013/0015416 A1 | 1/2013 | Takenaka et al. | |
| 2014/0107314 A1 | 4/2014 | Kawato et al. | |
| 2014/0340727 A1 | 11/2014 | Mori et al. | |
| 2015/0051390 A1* | 2/2015 | Yokota | C08B 37/0015 536/103 |
| 2015/0094463 A1* | 4/2015 | Oomori | C08B 37/0015 536/46 |
| 2016/0222285 A1* | 8/2016 | Shimizu | C09K 9/02 |

FOREIGN PATENT DOCUMENTS

| | | |
|---|---|---|
| EP | 2 377 906 A1 | 10/2011 |
| JP | 11-71368 A | 3/1999 |
| JP | 2003-245899 A | 9/2003 |
| JP | 3475252 B2 | 12/2003 |
| JP | 2008-542424 A | 11/2008 |
| JP | 2012-189746 * | 10/2012 |
| JP | 2012-189746 A | 10/2012 |
| JP | 2012-229307 A | 11/2012 |
| WO | WO 03/011967 A1 | 2/2003 |
| WO | WO 2009/075388 A1 | 6/2009 |
| WO | WO 2011/125956 A1 | 10/2011 |
| WO | WO 2012/176439 A1 | 12/2012 |
| WO | WO 2013/099640 A1 | 7/2013 |

OTHER PUBLICATIONS

Chinese Office Action dated Feb. 3, 2017, issued in corresponding Chinese Patent Application No. 201480058926.4.
Jian-Ke Sun et al.; Reversible luminescence switch in a photochromic metal-organic framework; Chemical Communication, 2011; vol. 47; pp. 6870-6872.
International Search Report for PCT/JP2014/079560 dated Feb. 10, 2015.
Sun et al., "Reversible luminescence switch in a photochromic metal-organic framework", Chemical Communications, Jun. 28, 2011, vol. 47, No. 24, pp. 6870-6872, total 6 pages.
Written Opinion of the International Searching Authority for PCT/JP2014/079560 (PCT/ISA/237) dated Feb. 10, 2015.

* cited by examiner

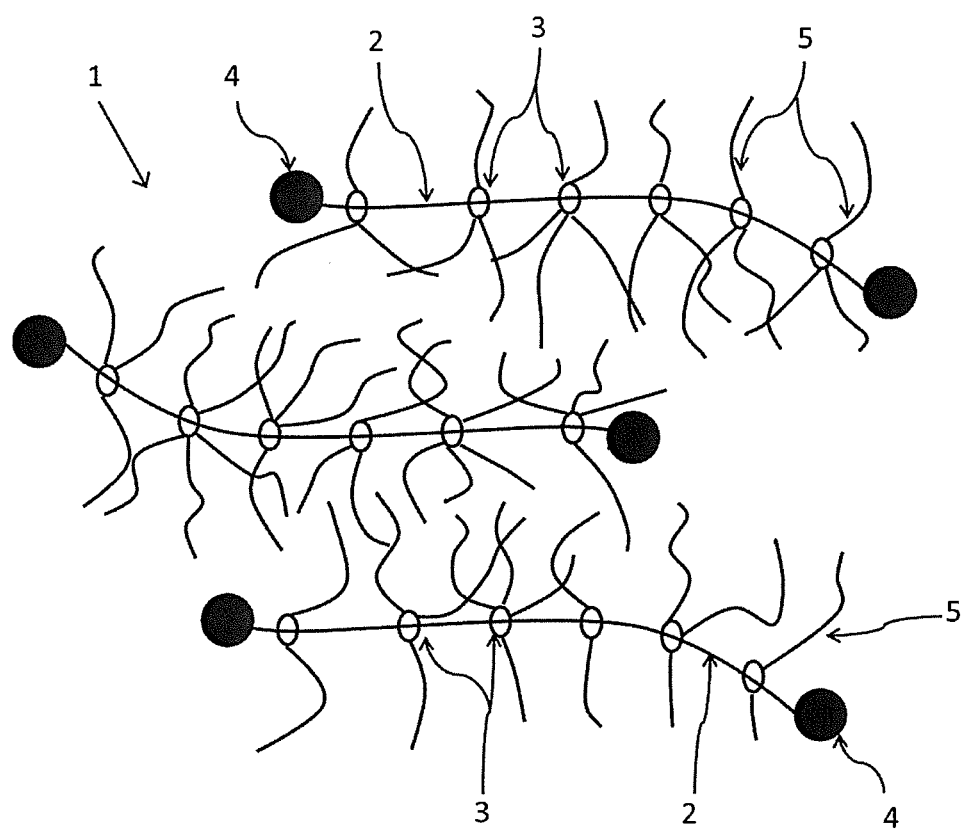

PHOTOCHROMIC COMPOSITION

TECHNICAL FIELD

This invention relates to a novel photochromic composition.

BACKGROUND ART

Photochromic compounds typified by chromene compounds, fulgide compounds and spirooxazine compounds have a characteristic feature (photochromic properties) that they change their colors swiftly upon exposure to light including ultraviolet light such as sunlight or light from a mercury lamp and return to their original colors when they are put in the dark by stopping their exposure to light and are used for various purposes, especially optical materials, making use of this characteristic feature.

For example, photochromic spectacle lenses which are provided with photochromic properties by using a photochromic compound function as sunglasses which are quickly colored outdoors where they are irradiated with light including ultraviolet light such as sunlight and as ordinary transparent eyeglasses which are faded indoors where there is no irradiation, and demand for the photochromic spectacle lenses is growing nowadays.

To provide photochromic properties to an optical material, a photochromic compound is generally used in combination with a plastic material. Stated more specifically, the following means are known.
(a) A method in which a photochromic compound is dissolved in a polymerizable monomer and the obtained solution is polymerized to directly mold an optical material such as a lens.

This method is called "kneading method".
(b) A method in which a resin layer containing a photochromic compound dispersed therein is formed on the surface of a plastic molded article such as a lens by coating or cast polymerization.

This method is called "lamination method".
(c) A method in which two optical sheets are bonded together by means of an adhesive layer formed of an adhesive resin containing a photochromic compound dispersed therein.

This method is called "binder method".

For optical materials such as optical articles provided with photochromic properties, the following properties are further required.
(I) The degree of coloration at a visible light range before ultraviolet light is applied (to be referred to as "initial coloration" hereinafter) should be low.
(II) The degree of coloration upon exposure to ultraviolet light (to be referred to as "color optical density" hereinafter) should be high.
(III) The speed from the stoppage of the application of ultraviolet light to the time when the compound returns to its original state (to be referred to as "fading speed" hereinafter) should be high.
(IV) The repeat durability of a reversible function between color development and fading should be high.
(V) Storage stability should be high.
(VI) The compound should be easily molded into various shapes.
(VII) Photochromic properties should be provided without the degradation of mechanical strength.

When optical materials having photochromic properties are to be produced by the above means (a) to (c), various proposals have been made to satisfy the above requirements. As for color optical density and fading speed, it is now desired that more excellent photochromic properties should be developed.

For example, since the above-described kneading method has an advantage that photochromic plastic lenses can be mass-produced at a low cost by using glass molds, most of photochromic plastic lenses are now manufactured by this method.

However, as strength is required for a lens substrate in the kneading method, it is necessary to enhance the mechanical strength of a matrix resin containing a photochromic compound dispersed therein. Therefore, it is difficult to develop excellent photochromic properties. That is, since the degree of freedom of molecules of the photochromic compound existent in the matrix resin becomes low, a photochromic reversible reaction is impaired.

For example, as for this kneading method, Patent Document 1 discloses a technique for adding a photochromic compound to a monomer composition comprising an isocyanate monomer and a thiol monomer. Patent Document 2 discloses a photochromic curable composition comprising a specific (meth)acrylic polymerizable monomer and a photochromic compound.

Therefore, photochromic lenses molded by polymerization-curing these compositions are unsatisfactory in terms of photochromic properties, especially fading speed, though they have high mechanical strength.

Meanwhile, in the lamination method and the binder method as compared with the above-described kneading method, since photochromic properties are developed with a thin layer formed on the surface of a substrate, to develop the same color optical density as that of the kneading method, a photochromic compound must be dissolved in a high concentration. In this case, there occurs a problem such as unsatisfactory solubility or precipitation during storage according to the type of a photochromic compound. Further, since the layer which develops photochromic properties is thin, the photochromic compound may be inferior in durability.

For example, Patent Document 3 discloses that a photochromic curable composition is applied to a plastic lens by spin coating and optically cured to form a photochromic coating layer (this lamination method is also called "coating method").

Patent Document 4 discloses a photochromic layer method (to be also referred to as "two-stage polymerization method" hereinafter) in which a photochromic layer is formed by securing a space between a plastic lens and a glass mold by means of a member such as an elastomer gasket, adhesive tape or spacer, pouring a photochromic curable composition into this space and polymerization-curing the composition.

Further, Patent Document 5 discloses that a laminated sheet is produced by bonding together transparent carbonate sheets by means of a polyurethane resin adhesive layer containing a photochromic compound (binder method).

Therefore, since photochromic properties are developed with a thin layer containing a photochromic compound in all of Patent Documents 3 to 5, when a photochromic compound having low solubility is used, color optical density tends to become low and further, the photochromic compound may be inferior in durability.

Thus, according to the current known technologies, either one of color optical density and fading speed tends to become unsatisfactory.

PRIOR ART DOCUMENTS

Patent Documents

Patent Document 1: WO2012/176439
Patent Document 2: WO2009/075388
Patent Document 3: WO2011/125956
Patent Document 4: WO2003/011967
Patent Document 5: WO2013/099640

DISCLOSURE OF THE INVENTION

Problems to be Solved by the Invention

It is therefore an object of this invention to provide a photochromic composition which can provide excellent photochromic properties such as color optical density and fading speed.

It is another object of this invention to provide a photochromic composition which can provide a photochromic cured body having high mechanical properties and high moldability as well as excellent photochromic properties.

Means for Solving the Problem

The inventors of this invention conducted intensive studies to solve the above problems. As a result, they succeeded in solving the problems by combining a photochromic compound with a polyrotaxane.

That is, according to this invention, there is provided a photochromic composition comprising (A) a polyrotaxane having a composite molecular structure composed of an axial molecule and a plurality of cyclic molecules clathrating the axial molecule and (B) a photochromic compound.

In this invention, the above polyrotaxane (A) is a molecule complex having a structure that a chain axial molecule passes through the rings of a plurality of cyclic molecules and a bulky group is bonded to both ends of the axial molecule so that the cyclic molecules cannot separate from the axial molecule due to steric hindrance.

This molecule complex like polyrotaxane is called "supramolecule".

The photochromic composition of this invention may take the following preferred modes.
(1) The ring contained in each of the cyclic molecules of the polyrotaxane (A) is a cyclodextrin ring, crown ether ring, benzo-crown ring, dibenzo-crown ring or dicyclohexano-crown ring.
(2) The axial molecule passing through the rings of the above cyclic molecules has a chain structure having a bulky group at both ends, the chain part is formed of polyethylene glycol, and the bulky group at both ends is an adamantyl group.
(3) When the maximum number of the cyclic molecules capable of clathrating one axial molecule is 1, the number of clathrating cyclic molecules contained in the polyrotaxane (A) is 0.001 to 0.6.
(4) A side chain is introduced into at least part of the ring contained in each of the cyclic molecules in the polyrotaxane (A).
(5) The above side chain is formed by repetitions of an organic chain having 3 to 20 carbon atoms.
(6) The above side chain is introduced into not less than 6% of the total number of all the functional groups of the above ring.
(7) A polymerizable functional group is introduced into the above side chain.
(8) The above polymerizable functional group is a radically polymerizable group, epoxy group, OH group, SH group, $NH_2$ group, episulfide group, thietanyl group, NCO group or NCS group.
(9) The photochromic composition comprises the photochromic compound (B) in an amount of 0.0001 to 10 parts by mass based on 100 parts by mass of the polyrotaxane (A).
(10) The photochromic composition further comprises (C) a polymerizable monomer.
(11) The photochromic composition further comprises (D) a polymerization-curing accelerator.

According to this invention, there are further provided a photochromic cured body obtained by curing the above photochromic composition comprising the polymerizable monomer (C) and a photochromic laminate having a layer composed of the photochromic cured body on the surface of an optical substrate.

According to this invention, there is still further provided a photochromic laminated sheet having two opposed transparent sheets which are bonded together by means of an adhesive layer composed of the above photochromic cured body.

Effect of the Invention

By using the photochromic composition of this invention, as shown in Examples which will be described hereinafter, photochromic properties including improved color developability and fading speed can be developed.

The development of the above photochromic properties is due to the use of a polyrotaxane in combination with a photochromic compound. The inventors of this invention consider the reason for this as follows.

That is, it is believed that, as the cyclic molecules of the polyrotaxane can slide over the axial molecule to form a space around the cyclic molecules, the reversible structural change of the photochromic compound occurs swiftly due to this space with the result of improved fading speed and improved color optical density. It is further believed that the introduction of the cyclic molecules into which the side chain has been introduced causes the reversible structural change of the photochromic compound existent near the side chains having high flexibility swiftly.

Therefore, even when a cured body is formed by mixing a polymerizable monomer or the like with this photochromic composition and polymerization-curing it, a space which does not disturb the reversible structural change of the photochromic compound is formed by the sliding of the above cyclic molecules, thereby improving fading speed and color optical density.

It is understood from this that when a photochromic lens is molded from the photochromic composition of this invention, for example, by the kneading method, mechanical strength can be improved without impairing photochromic properties (color optical density and fading speed). Even when a layer having photochromic properties is formed by the lamination method or the binder method, sufficiently high color optical density can be ensured.

BRIEF DESCRIPTION OF THE INVENTION

FIG. 1 This is a schematic diagram showing the molecular structure of a polyrotaxane used in this invention.

BEST MODE FOR CARRYING OUT THE INVENTION

The photochromic composition of this invention comprises (A) a polyrotaxane and (B) a photochromic compound, (C) a polymerizable monomer and (D) a polymerization-curing accelerator (D) according to its use form, and further other known compounding agents.

(A) Polyrotaxane

The polyrotaxane is a known compound. As shown in FIG. 1, the polyrotaxane molecule represented by "1" as a whole has a composite molecular structure composed of a chain axial molecule "2" and cyclic molecules "3". That is, a plurality of the cyclic molecules "3" clathrate the chain axial molecule "2", and the axial molecule "2" passes through the inside of the ring of each of the cyclic molecules "3". Therefore, the cyclic molecules "3" can slide freely over the axial molecule "2" but a bulky terminal group "4" is formed at both ends of the axial molecule "2" to prevent the cyclic molecules "3" from falling off from the axial molecule "2".

That is, since the cyclic molecules "3" can slide over the axial molecule "2" as described above, a space capable of allowing for the reversible reaction of the photochromic compound is ensured, thereby making it possible to obtain high color optical density and high fading speed.

In the polyrotaxane, various axial molecules are known. For example, the chain part may be linear or branched as long as the axial molecule can pass through the rings of the cyclic molecules and is generally formed of a polymer.

Examples of the polymer forming the chain part of the axial molecule include polyvinyl alcohol, polyvinyl pyrrolidone, cellulose-based resins (such as carboxymethyl cellulose, hydroxyethyl cellulose and hydroxypropyl cellulose), polyacrylamide, polyethylene oxide, polyethylene glycol, polypropylene glycol, polyvinyl acetal, polyvinyl methyl ether, polyamine, polyethylene imine, casein, gelatin, starch, olefin-based resins (such as polyethylene and polypropylene), polyester, polyvinyl chloride, styrene-based resins (such as polystyrene and acrylonitrile-styrene copolymer resin), acrylic resins (such as poly(meth)acrylic acid, polymethyl methacrylate, polymethyl acrylate and acrylonitrile-methyl acrylate copolymer resin), polycarbonate, polyurethane, vinyl chloride-vinyl acetate copolymer resin, polyvinyl butyral, polyisobutylene, polytetrahydrofuran, polyaniline, acrylonitrile-butadiene-styrene copolymer (ABS resin), polyamides (such as nylon), polyimide, polydienes (such as polyisoprene and polybutadiene), polysiloxanes (such as polydimethylsiloxane), polysulfone, polyimine, polyacetic anhydride, polyurea, polysulfide, polyphosphazene, polyketone polyphenylene and polyhalo olefins. These polymers may be copolymerized or modified.

In this invention, the polymer forming the chain part is preferably polyethylene glycol, polyisoprene, polyisobutylene, polybutadiene, polypropylene glycol, polytetrahydrofuran, polydimethylsiloxane, polyethylene, polypropylene, polyvinyl alcohol or polyvinyl methyl ether, most preferably polyethylene glycol.

Although the bulky group formed at both ends of the chain part is not particularly limited if it is a group which prevents the separation of the cyclic molecules from the axial molecule, from the viewpoint of bulkiness, the bulky group is selected from adamantyl group, trityl group, fluoresceinyl group, dinitrophenyl group and pyrenyl group, out of which adamantyl group is preferred from the viewpoint of introduction ease.

The molecular weight of the above-described axial molecule is not particularly limited. However, when it is too high, compatibility with another component, for example, the polymerizable monomer (C) which is suitably compounded tends to become low and when it is too low, the movability of the cyclic molecules degrades, whereby photochromic properties tend to deteriorate. From this point of view, the weight average molecular weight Mw of the axial molecule is 1,000 to 100,000, preferably 5,000 to 80,000, particularly preferably 10,000 to 50,000.

Each of the cyclic molecules should have a ring large enough to clathrate the above axial molecule, and examples of this ring include cyclodextrin ring, crown ether ring, benzo-crown ring, dibenzo-crown ring and dicyclohexane-crown ring, out of which cyclodextrin ring is particularly preferred.

The cyclodextrin ring has α-form (ring inner diameter of 0.45 to 0.6 nm), β-form (ring inner diameter of 0.6 to 0.8 nm) or γ-form (ring inner diameter of 0.8 to 0.95 nm). In this invention, α-cyclodextrin ring and γ-cyclodextrin ring are preferred, and α-cyclodextrin ring is most preferred.

A plurality of the cyclic molecules having the above ring clathrate one axial molecule. In general, when the maximum number of cyclic molecules capable of clathrating one axial molecule is 1, the number of clathrating cyclic molecules is preferably 0.001 to 0.6, more preferably 0.002 to 0.5, much more preferably 0.003 to 0.4. When the number of clathrating cyclic molecules is too large, the cyclic molecules are densely existent for one axial molecule, whereby their movability degrades and accordingly, photochromic properties tend to deteriorate. When the number of clathrating cyclic molecules is too small, the space between axial molecules becomes narrow, whereby the number of spaces capable of allowing for the reversible reaction of the photochromic compound molecule decreases and accordingly, photochromic properties tend to deteriorate as well.

The maximum number of cyclic molecules clathrating one axial molecule can be calculated from the length of the axial molecule and the thickness of the ring of each of the cyclic molecules.

For example, when the chain part of the axial molecule is formed of polyethylene glycol and the ring of the cyclic molecule is an α-cyclodextrin ring, the maximum number of clathrating cyclic molecules is calculated as follows.

That is, two recurring units [—$CH_2$—$CH_2$O-] of polyethylene glycol approximate the thickness of one α-cyclodextrin ring. Therefore, the number of the recurring units is calculated from the molecular weight of polyethylene glycol so as to obtain ½ of the number of the recurring units as the maximum number of clathrating cyclic molecules. Based on the condition that the maximum number of clathrating cyclic molecules is 1.0, the number of clathrating cyclic molecules is adjusted to the above-specified range.

Further, in this invention, the side chain may be introduced into the ring of the above-described cyclic molecule. This side chain is represented by "5" in FIG. 1.

That is, by introducing this side chain "5" into the ring, an appropriate space can be surely formed between adjacent axial molecules, thereby making it possible to ensure a gap capable of allowing for the reversible reaction of the photochromic compound molecule and to develop excellent photochromic properties. This side chain "5" forms a pseudo crosslinked structure in the polyrotaxane, whereby the mechanical strength of a photochromic cured body formed by using the photochromic composition of this invention can be improved.

The above side chain is preferably formed by repetitions of an organic chain having 3 to 20 carbon atoms, and the weight average molecular weight of this side chain is 300 to 10,000, preferably 350 to 8,000, much more preferably 350 to 5,000, most preferably 400 to 1,500. That is, when the side chain is too small, its function of ensuring the gap capable of allowing for the reversible reaction of the photochromic compound molecule becomes unsatisfactory and when the side chain is too large, it is difficult to densely mix the photochromic compound which will be described hereinafter with the polyrotaxane, thereby making it difficult to fully utilize the space ensured by the polyrotaxane.

Further, the above side chain is introduced by using the functional groups of the ring of the cyclic molecule and modifying them. For example, the α-cyclodextrin ring has 18 hydroxyl groups as functional groups through which the side chain is introduced. That is, a maximum of 18 side chains can be introduced into one α-cyclodextrin ring. In this invention, to obtain the function of the above-described side chain fully, not less than 6%, particularly not less than 30% of the total number of all the functional groups of the ring are preferably modified by the side chain. When the side chain is bonded to 9 out of the 18 hydroxyl groups of the above α-cyclodextrin ring, the degree of modification is 50%.

In this invention, the above side chain (organic chain) may be linear or branched as long as its size falls within the above range, and a side chain having an appropriate size can be introduced by reacting a suitable compound with the functional groups of the above ring by utilizing ring-opening polymerization, radical polymerization, cationic polymerization, anionic polymerization or living radical polymerization such as atom transfer radical polymerization, RAFT polymerization or NMP polymerization.

For example, a side chain derived from a cyclic compound such as cyclic lactone, cyclic ether, cyclic acetal, cyclic amine, cyclic carbonate, cyclic iminoether or cyclic thiocarbonate may be introduced by ring-opening polymerization. From the viewpoints of acquisition ease, high reactivity and easy control of size (molecular weight), a cyclic ether, cyclic siloxane, lactone or cyclic carbonate is preferably used. Preferred examples of the cyclic compound are given below.

Cyclic ethers; ethylene oxide, 1,2-propylene oxide, epichlorohydrin, epibromohydrin, 1,2-butylene oxide, 2,3-butylene oxide, isobutylene oxide, oxetane, 3-methyl oxatane, 3,3-dimethyloxetane, tetrahydrofuran, 2-methyl tetrahydrofuran and 3-methyl tetrahydrofuran Cyclic siloxanes; hexamethyl cyclotrisiloxane and octamethyl cyclotetrasiloxane Lactones;
4-membered ring lactones such as β-propiolactone, β-methyl propiolactone and L-serine-β-lactone
5-membered ring lactones such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methyl-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butyrolactone, γ-crotonolactone, α-methyl-γ-butyrolactone, α-methacryloyloxy-γ-butyrolactone and β-methacryloyloxy-γ-butyrolactone
6-membered lactones such as S-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, δ-lactone 4-hydroxy-1-cyclohexane carboxylate, monomethyl-δ-valerolactone, monoethyl-δ-valerolactone, monohexyl-δ-valerolactone, 1,4-dioxan-2-one and 1,5-dioxepan-2-one
7-membered ring lactones such as monoalkyl-ε-caprolactone, dialkyl-ε-caprolactone, monomethyl-ε-caprolactone monoethyl-ε-caprolactone, monohexyl-ε-caprolactone, dimethyl-ε-caprolactone, di-n-propyl-ε-caprolactone di-n-hexyl-ε-caprolactone, trimethyl-ε-caprolactone triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one and 5-hydroxymethyl-oxepan-2-one
8-membered ring lactones such as ξ-enantholactone other lactones such as lactone, lactide, dilactide, tetramethyl glycoside, 1,5-dioxepan-2-one and t-butyl caprolactone
Cyclic carbonates; ethylene carbonate, propylene carbonate, 1,2-butylene carbonate, glycerol 1,2-carbonate, 4-(methoxymethyl)-1,3-dioxolan-2-one, (chloromethyl)ethylene carbonate, vinylene carbonate, 4,5-dimethyl-1,3-dioxol-2-one, 4-chloromethyl-5-methyl-1,3-dioxol-2-one, 4-vinyl-1,3-dioxolan-2-one, 4,5-diphenyl-1,3-dioxolan-2-one, 4,4-dimethyl-5-methyl-1,3-dioxolan-2-one, 1,3-dioxan-2-one, 5-methyl-5-propyl-1,3-dioxolan-2-one and 5,5-diethyl-1,3-dioxolan-2-one The above cyclic compounds may be used alone or in combination.

In this invention, lactones and cyclic carbonates are preferred, lactones such as ε-caprolactone, α-acetyl-γ-butyrolactone, α-methyl-γ-butyrolactone, γ-valerolactone and γ-butyrolactone are particularly preferred, and ε-caprolactone is most preferred.

When the side chain is to be introduced by reacting the cyclic compound through ring-opening polymerization, a functional group (for example, hydroxyl group) bonded to the ring has poor reactivity, whereby it may be difficult to directly react a large molecule due to steric hindrance. In this case, in order to react caprolactone, for example, there can be employed means for introducing the side chain through ring-opening polymerization using the above-described cyclic compound after a highly reactive functional group (hydroxyl group) is introduced by hydroxypropylation through a reaction between a low-molecular weight compound such as propylene oxide and the functional group.

Although the compound used to introduce the side chain by using radical polymerization is a radically polymerizable compound, the ring of the cyclic molecule of the polyrotaxane does not have an active site as a radical starting point. Therefore, prior to the reaction of the radically polymerizable compound, a compound for forming the radical starting point must be reacted with a functional group (hydroxyl group) of the ring to form the active site as the radical starting point.

The compound for forming the above radical starting point is typified by organic halogen compounds such as 2-bromoisobutyl bromide, 2-bromobutylic acid, 2-bromopripionic acid, 2-chloropropionic acid, 2-bromoisobutyric acid, epichlorohydrin, epibromohydrin and 2-chloroethy isocyanate.

That is, the organic halogen compound is bonded to the ring of the cyclic molecule through a condensation reaction with a functional group of the ring, thereby introducing a group containing a halogen atom (organic halogen compound residue). A radical is produced in this organic halogen compound residue by the movement of a halogen atom upon radical polymerization to become the radical polymerization starting point from which radical polymerization proceeds.

The above group having an active site as the radical polymerization starting point (organic halogen compound residue) can also be introduced, for example, by reacting a compound having a functional group such as amine, carboxylic acid, isocyanate, imidazole or acid anhydride with a hydroxyl group of the ring to introduce a functional group other than the hydroxyl group and reacting the above-described organic halogen compound with this functional group.

As the radically polymerizable compound used to introduce the side chain through radical polymerization, a compound having at least one group with an ethylenically unsaturated bond, for example, a functional group such as (meth)acrylic group, vinyl group or styryl group (to be referred to as "ethylenically unsaturated monomer" hereinafter) is preferably used.

The following compounds are examples of the ethylenically unsaturated monomer.

Alkyl (meth)acrylates; methyl (meth)acrylate, ethyl (meth)acrylate, n-propyl (meth)acrylate, n-butyl (meth)acrylate, t-butyl (meth)acrylate and stearyl (meth)acrylate Hydroxy (meth)acrylates; 2-hydroxyethyl (meth)acrylate and 2-hydroxypropyl (meth)acrylates Cyano (meth)acrylates; cyanoethyl (meth)acrylate Amino-based (meth)acrylates; (meth)acrylamide, N,N-dimethyl (meth)acrylamide, N-isopropyl (meth)acrylamide, N,N-dimethylaminoethyl (meth)acrylate and maleinimide (meth)acrylate Fluoroalkyl (meth)acrylates; trifluoroethyl (meth)acrylate and pentaflurobutyl (meth)acrylate Siloxanyl (meth)acrylates; tris(trimethylsiloxanyl)silylpropyl (meth)acrylate Alkylene glycol polyol (meth)acrylates; ethylene glycol (meth)acrylate, triethylene glycol (meth)acrylate, polyethylene glycol (meth)acrylate, propylene glycol (meth)acrylate and polypropylene glycol (meth)acrylate Aromatic vinyl compounds; styrene, p-methylstyrene, m-methoxystyrene and p-hydroxystyrene Vinyl salt compounds; sodium 4-vinyl benzoate and sodium p-styrene sulfonate Amphoteric (meth)acrylates; 2-methoxyacryloyloxyethyl phosphorylcholine and [2-(methacryloyloxy)ethyl]dimethyl (3-sulfopropyl)ammonium hydroxide Unsaturated monocarboxylic acids or esters thereof; cinnamic acid and crotonic acid Oxirane compounds; glycidyl (meth)acrylate Oxetane compounds; 2-oxetanemethyl (meth)acrylate Unsaturated polycarboxylic acids (anhydrides); maleic acid (anhydride) and fumaric acid (anhydride)

Besides the ethylenically unsaturated monomers, oligomers or polymers having a terminal ethylenically unsaturated bond (to be also referred to as "macromonomers" hereinafter) may also be used.

Components forming the main chains of these macromonomers are given below.

Polyethers; polyethylene oxide, polypropylene oxide and polytetramethylene oxide Polyesters; polyethylene terephthalate and polycaprolactone Polymers having a hydrocarbon main chain; polyethylene, polypropylene, polystyrene, polyvinyl methyl ether and poly(meth)acrylate Polyamides; polyhexamethylene adipamide Other polymers; polyimide acid, polyimine amine, polyurethane, polyurea, polydimethylsiloxane, polycarbonate polymers and copolymers of the above polymers The above-described monomers or macromonomers may be used alone or in combination of two or more.

The above-described side chain of an appropriate size is introduced by using the above radically polymerizable compound to carryout radical polymerization (preferably, living radical polymerization such as atom transfer radical polymerization, RAFT polymerization or NMP polymerization) in the presence of the ring into which the above radical polymerization starting point has been introduced and adjusting the degree of polymerization to a suitable range.

As understood from the above explanation, the side chain to be introduced into the ring of the cyclic compound has a recurring unit introduced by —O— bond, —NH— bond or —S— bond according to the introduction system or a substituent such as hydroxyl group, carboxyl group, acyl group, phenyl group, halogen atom, silyl group, mercapto group, vinyl group, episulfide group, thietanyl group, NCO group or NCS group.

Further, according to the type of the functional group of the compound used to introduce the side chain, part of the side chain may be bonded to a functional group of the ring of a cyclic molecule of another axial molecule to form a crosslinked structure.

In the polyrotaxane used in this invention, a polymerizable functional group capable of polymerization reacting with the polymerizable monomer (C) which will be described hereinafter is preferably introduced into the ring of the cyclic molecule, whereby its compatibility with the polymerizable monomer (C) is enhanced and further the photochromic compound is kept homogeneous in a cured body obtained by polymerizing the polymerizable monomer (C) while it is dispersed in the space of the polyrotaxane, thereby making it possible to develop excellent photochromic properties continuously and enhance the mechanical strength of the cured body.

The polymerizable functional group is introduced by utilizing the above-described side chain, and a suitable side chain forming compound may be used to introduce the polymerizable functional group.

Typical examples of the polymerizable functional group include radically polymerizable groups such as (meth)acryloyl group, vinyl group and allyl group. According to the type of the polymerizable monomer (C), epoxy group, OH group, SH group, $NH_2$ group, episulfide group, thietanyl group, NCO group or NCS group also functions as the polymerizable functional group.

For example, epoxy group, episulfide group and thiotanyl group react with the $NH_2$ group or NCO group of the polymerizable monomer (C).

OH group and SH group react with the NCO group or NCS group of the polymerizable monomer (C) to form a urethane bond or thiourethane bond.

NCO group and NCS group react with the OH group, SH group or $NH_2$ group of the polymerizable monomer (C).

In this invention, the polyrotaxane (A) which is most preferably used is such that polyethylene glycol whose both ends are bonded to an adamantyl group is used as the axial molecule, a cyclic molecule having an α-cyclodextrin ring is used as the cyclic molecule, and further the side chain (having a terminal OH group) is introduced into the ring by polycaprolactone, or a (meth)acrylic group is introduced into the side chain.

(B) Photochromic Compound;

Photochromic compounds known per se may be used as the photochromic compound exhibiting photochromic properties. They may be used alone or in combination of two or more.

Typical examples of this photochromic compound are fulgide compounds, chromene compounds and spirooxazine compounds all of which are disclosed by many documents, for example, JP-A 2-28154, JP-A 62-288830, WO94/22850 and WO96/14596.

In this invention, out of known photochromic compounds, chromene compounds having an indeno(2,1-f)naphtho(1,2-b)pyran skeleton are preferably used from the viewpoints of photochromic properties such as color optical density, initial coloration, durability and fading speed, and chromene compounds having a molecular weight of not less than 540 are particularly preferably used as they are excellent particularly in color optical density and fading speed.

The following chromene compounds are particularly preferably used in this invention.

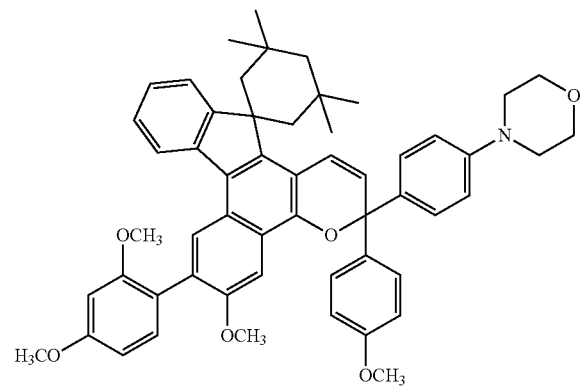

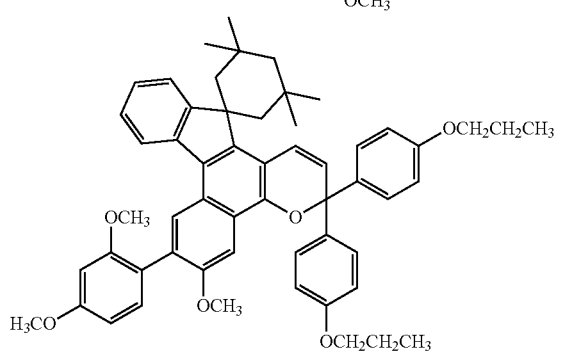

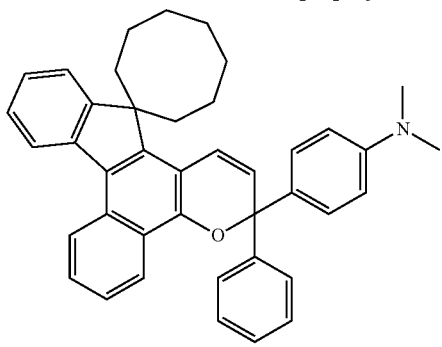

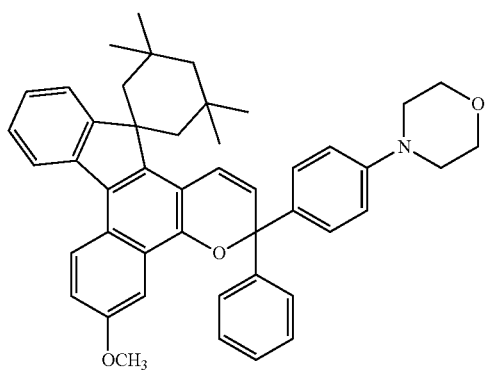

(C) Polymerizable Monomer;

The photochromic composition of this invention may comprise a polymerizable monomer (C) as required. This polymerizable monomer is selected from (C1) a radically polymerizable monomer, (C2) an epoxy-based polymerizable monomer, (C3) a urethane- or urea-based polymerizable monomer capable of forming a urethane bond or urea bond and (C4) another polymerizable monomer except for (C1) to (C3). When a polymerizable group is introduced into the side chain of the polyrotaxane (A), a polymerizable monomer able to react with this polymerizable group is preferably used.

(C1) Radically Polymerizable Monomer;

This radically polymerizable monomer (C1) is preferably used when a radically polymerizable functional group is introduced into the side chain of the polyrotaxane (A). Radically polymerizable monomers are roughly divided into (C1-1) (meth)acrylic polymerizable monomers having a (meth)acrylic group, (C1-2) vinyl-based polymerizable monomers having a vinyl group, (C1-3) allyl-based polymerizable monomers having an allyl group, and (C1-4) silsesquioxane-based polymerizable monomers.

Examples of these are given below.

Examples of (Meth)Acrylic Polymerizable Monomers (C1-1)

Compounds represented by the following formulas (1) to (4)

Compounds Presented by the Formula (1)

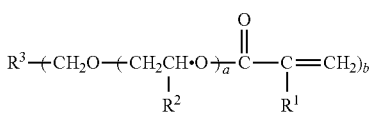

In the above formula, $R^1$ is a hydrogen atom or methyl group, $R^2$ is a hydrogen atom or alkyl group having 1 to 2 carbon atoms, $R^3$ is a trivalent to hexavalent organic group having 1 to 10 carbon atoms, "a" is an average value of 0 to 3, "b" is a number of 3 to 6, the alkyl group having 1 to 2 carbon atoms represented by $R^2$ is preferably a methyl group, and examples of the organic group represented by $R^3$ include groups derived from polyols, trivalent to hexavalent hydrocarbon groups and trivalent to hexavalent organic groups containing a urethane bond.

Examples of the compounds represented by the above formula (1) are given below.

Trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate and ditrimethylolpropane tetraacrylate Compounds Represented by the Formula (2)

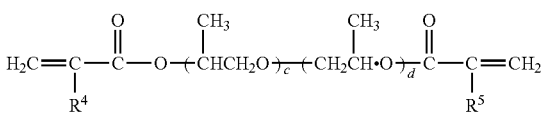

In the above formula, $R^4$ and $R^5$ are each a hydrogen atom or methyl group, and "c" and "d" are each an integer of 0 or more.

When $R^4$ and $R^5$ are both methyl groups, (c+d) is an average value of 2 or more to less than 7, when $R^4$ is a methyl group and $R^5$ is a hydrogen atom, (c+d) is an average value of 2 or more to less than 5, and when $R^4$ and $R^5$ are both hydrogen atoms, (c+d) is an average value of 2 or more to less than 3.

Examples of the compounds represented by the above formula (2) are given below.

Propylene glycol di(meth)acrylates such as tripropylene glycol dimethacrylate and tetrapropylene glycol dimethacrylate.

Compounds Represented by the Formula (3)

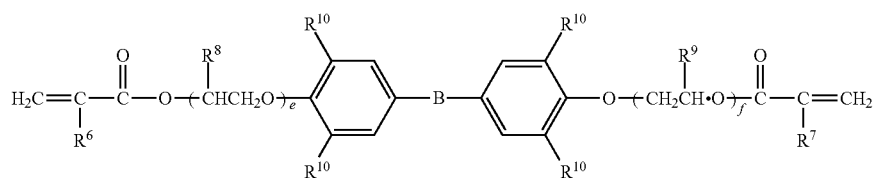

(3)

In the above formula, $R^6$ and $R^7$ are each a hydrogen atom or methyl group, $R^8$ and $R^9$ are each a hydrogen atom or methyl group, $R^{10}$ is a hydrogen atom or halogen atom, B is any one of —O—, —S—, —(SO$_2$)—, —CO—, —CH$_2$—, —CH=CH—, —C(CH$_3$)$_2$— and —C(CH$_3$)(C$_6$H$_5$)—, "e" and "f" are each an integer of 1 or more, and (e+f) is an average value of 2 to 30.

This polymerizable monomer represented by the above formula (3) is obtained as a mixture of molecules having different molecular weights. Therefore, "e" and "f" are given as average values.

Examples of the compounds represented by the above formula (3) include the following bisphenol A di(meth) acrylates.
2,2-bis[4-methacryloyloxy.ethoxy]phenyl]propane (e+f=2), 2,2-bis[4-methacryloyloxy.diethoxy]phenyl]propane (e+f=4), 2,2-bis[4-methacryloyloxy.polyethoxy]phenyl]propane (e+f=7), 2,2-bis(3,5-dibromo-4-methacryloyloxy-ethoxyphenyl)propane (e+f=2), 2,2-bis(4-methacryloyloxy-dipropoxyphenyl)propane (e+f=4), 2,2-bis[4-acryloyloxy.diethoxy]phenyl]propane (e+f=4), 2,2-bis[4-acryloyloxy.polyethoxy]phenyl]propane (e+f=3), 2,2-bis[4-acryloyloxy.polyethoxy]phenyl]propane (e+f=7), 2,2-bis[4-methacryloyloxy(polyethoxy)phenyl]propane (e+f=10), 2,2-bis[4-methacryloyloxy(polyethoxy)phenyl]propane (e+f=17), 2,2-bis[4-methacryloyloxy(polyethoxy)phenyl]propane (e+f=30), 2,2-bis[4-acryloyloxy(polyethoxy)phenyl]propane (e+f=10) and 2,2-bis[4-acryloyloxy(polyethoxy)phenyl]propane (e+f=20)

Compounds Represented by the Formula (4)

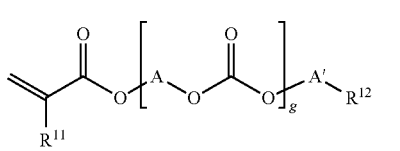

(4)

In the above formula, "g" is an average value of 1 to 20, A and A' may be the same or different and each a linear or branched alkylene group having 2 to 15 carbon atoms, when there are a plurality of A's, A's may be the same or different, $R^{11}$ is a hydrogen atom or methyl group, and $R^{12}$ is a (meth)acryloyloxy group or hydroxyl group.

The compounds represented by the above formula (4) can be produced by reacting a polycarbonate diol with (meth) acrylic acid.

Examples of the polycarbonate diol used herein include the following.

Polycarbonate diols obtained by phosgenating a polyalkylene glycol such as trimethylene glycol, tetramethylene glycol, pentamethylene glycol, hexamethylene glycol, octamethylene glycol or nonamethylene glycol (having a number average molecular weight of 500 to 2,000); polycarbonate diols obtained by phosgenating a mixture of two or more polyalkylene glycols such as a mixture of trimethylene glycol and tetramethylene glycol, a mixture of tetramethylene glycol and hexamethylene glycol, a mixture of pentamethylene glycol and hexamethylene glycol, a mixture of tetramethylene glycol and octamethylene glycol or a mixture of hexamethylene glycol and octamethylene glycol (number average molecular weight of 500 to 2,000); and polycarbonate diols obtained by phosgenating 1-methyl trimethylene glycol (number average molecular weight of 500 to 2,000).

(Meth)acrylic polymerizable monomers except for the compounds represented by the above formulas (1) to (4) may also be used and include the following.

Methoxy polyethylene glycol methacrylate (especially average molecular weight of 293), methoxy polyethylene glycol methacrylate (especially average molecular weight of 468), methoxy polyethylene glycol acrylate (especially average molecular weight of 218), methoxy polyethylene glycol acrylate (especially average molecular weight of 454), diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, dimethacrylates composed of a mixture of polypropylene glycol and polyethylene glycol (polyethylene has two recurring units and polypropylene has two recurring units), polyethylene glycol dimethacrylate (especially average molecular weight of 330), polyethylene glycol dimethacrylate (especially average molecular weight of 536), polytetramethylene glycol dimethacrylate (especially average molecular weight of 736), tripropylene glycol dimethacrylate, tetrapropylene glycol dimethacrylate, polypropylene glycol dimethacrylate (especially average molecular weight of 536), polyethylene glycol diacrylate (especially average molecular weight of 258), polyethylene glycol diacrylate (especially average molecular weight of 308), polyethylene glycol diacrylate (especially average molecular weight of 508), polyethylene glycol diacrylate (especially average molecular weight of 708), polyethylene glycol methacrylate acrylate (especially average molecular weight of 536), (polyethylene glycol/ polypropylene glycol)diacrylate copolymer (especially average molecular weight of 330), ethoxylated cyclohexane dimethanol acrylate (especially average molecular weight of 434), polyester oligomer hexaacrylate, caprolactone-modified dipentaerythritol hexaacrylate, tetrafunctional polyester oligomers (molecular weight of 2,500 to 3,500, such as EB80 of Daicel-UCB Co., Ltd.), tetrafunctional polyester oligomers (molecular weight of 6,000 to 8,000, such as EB450 of Dacel-UCB Co., Ltd.), hexafunctional polyester oligomers (molecular weight of 45,000 to 55,000, such as EB1830 of Daicel-UCB Co., Ltd.), tetrafunctional polyester oligomers (especially GX8488B of Dai-ichi Kogyo Seiyaku Co., Ltd. having a molecular weight of 10,000), ethylene glycol bisglycidyl methacrylate, 1,4-butylene glycol dimethacrylate, 1,9-nonylene glycol dimethacrylate, neopentylene glycol dimethacrylate, bis(2-methacryloyloxyethylthioethyl)sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio) ethane, 1,2-bis(methacryloyloxyisopropylthioisopropyl) sulfide, 1,2-bis(acryloyloxyisopropylthioisopropyl)sulfide, stearyl methacrylate, lauryl methacrylate, methyl acrylate, ethyl acrylate, butyl acrylate, octyl acrylate, lauryl acrylate, esters of (meth)acrylic acid such as methyl (meth)acrylate, benzyl (meth)acrylate, phenyl (meth)acrylate and 2-hydroxyethyl (meth)acrylate, esters of thioacrylic acid or thiomethacrylic acid such as methyl thioacrylate, benzyl thioacrylate and benzyl thiomethacrylate, and polyfunctional urethane (meth)acrylates Typical examples of the above polyfunctional urethane (meth)acrylates are reaction products of a polyol and a polyisocyanate.

Examples of the polyisocyanate include hexamethylene diisocyanate, isophorone diisocyanate, lysin isocyanate, 2,2,4-hexamethylene diisocyanate, dimer acid diisocyanate, isopropylidene bis-4-cyclohexyl isocyanate, dicyclohexylmethane diisocyanate, norbornene diisocyanate and methylcyclohexane diisocyanate.

Examples of the polyol include polyalkylene glycols having the recurring unit of ethylene oxide or propylene oxide having 2 to 4 carbon atoms, or hexamethylene oxide, and polyester diols such as polycaprolactone diols. Other examples include polycarbonate diols, polybutadiene diols, pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexane dimethanol, glycerin and trimethylol propane.

Urethane (meth)acrylate monomers which are reaction mixtures prepared by further reacting urethane prepolymers obtained by a reaction between the polyisocyanate and the polyol with 2-hydroxy (meth)acrylate or reaction mixtures prepared by directly reacting the above diisocyanate with 2-hydroxy (meth)acrylate may also be used.

Typical commercially available products of these urethane prepolymers and urethane (meth)acrylate monomers are given below.

For example, trifunctional products include U-4HA (molecular weight of 596, 4 functional groups), U-6HA (molecular weight of 1,019, 6 functional groups), U-6LPA (molecular weight of 818, 6 functional groups) and U-15HA (molecular weight of 2,300, 15 functional groups) of Shin-Nakamura Chemical Co., Ltd.

Bifunctional products include U-2PPA (molecular weight of 482), UA-122P (molecular weight of 1,100) and U-122P (molecular weight of 1, 100) of Shin-Nakamura Chemical Co., Ltd. and EB4858 (molecular weight of 454) of Daicel-UCB Co., Ltd.

Further, products having a (meth)acrylic equivalent of not less than 600 include U-108A, U-200PA, UA-511, U-412A, UA-4100, UA-4200, UA-4400, UA-2235PE, UA-160TM, UA-6100, UA-6200, U-108, UA-4000 and UA-512 of Shin-Nakamura Chemical Co., Ltd. and UX-2201, UX3204, UX4101, 6101, 7101 and 8101 of Nippon Kayaku Co., Ltd.

These polyisocyanates and polyols and polyfunctional urethane (meth)acrylates which are reaction mixtures of these may also be used as (C4) a urethane-based polymerizable monomer which will be described hereinafter.

(C1-2) Vinyl-Based Polymerizable Monomers;

Examples of the vinyl-based polymerizable monomers having a vinyl group include methyl vinyl ketone, ethyl vinyl ketone, ethyl vinyl ether, styrene, vinyl cyclohexane, butadiene, 1,4-pentadiene, divinyl sulfide, divinyl sulfone, 1,2-divinylbenzene, 1,3-divinyl-1,1,3,3-tetramethylpropane disiloxane, diethylene glycol divinyl ether, divinyl adipate, divinyl sebacate, ethylene glycol divinyl ether, divinyl sulfoxide, divinyl persulfide, dimethyl divinylsilane, 1,2,4-trivinyl cyclohexane, methyl trivinylsilane, a-methylstyrene and a-methylstyrene dimer.

Out of the vinyl-based polymerizable monomers enumerated above, a-methylstyrene and a-methylstyrene dimer function as polymerization control agents to improve the moldability of the photochromic composition.

(C1-3) Allyl-Based Polymerizable Monomers

Examples of the allyl-based polymerizable monomers having an allyl group are given below.

Diethylene glycol bisallyl carbonate, methoxy polyethylene glycol ally ether (especially average molecular weight of 550), methoxy polyethylene glycol ally ether (especially average molecular weight of 350), methoxy polyethylene glycol ally ether (especially average molecular weight of 1,500), polyethylene glycol allyl ether (especially average molecular weight of 450), methoxy polyethylene glycol-polypropylene glycol allyl ether (especially average molecular weight of 750), butoxy polyethylene glycol-polypropylene glycol allyl ether (especially average molecular weight of 1,600), methacryloyloxy polyethylene glycol-polypropylene glycol allyl ether (especially average molecular weight of 560), phenoxy polyethylene glycol allyl ether (especially average molecular weight of 600), methacryloyloxy polyethylene glycol allyl ether (especially average molecular weight of 430), acryloyloxy polyethylene glycol allyl ether (especially average molecular weight of 420), vinyloxy polyethylene glycol allyl ether (especially average molecular weight of 560), styryloxy polyethylene glycol ally ether (especially average molecular weight of 650) and methoxy polyethylene thioglycol ally ether (especially average molecular weight of 730).

Since the allyl-based polymerizable monomers function as chain transfer agents, they can improve the photochromic properties (color optical density, fading speed) of the photochromic composition.

(C1-4) Silsesquioxane Polymerizable Monomers;

The silsesquioxane polymerizable monomers take various molecular structures such as cage-like, ladder-like and random molecular structures and have a radically polymerizable group such as (meth)acrylic group.

Examples of the silsesquioxane polymerizable monomers include monomers represented by the following formula (5).

(5)

In the above formula, "h" is an integer of 3 to 100 which indicates the degree of polymerization, a plurality of $R^{13}$'s may be the same or different and each a radically polymerizable group, organic group containing a radically polymerizable group, hydrogen atom, alkyl group, cycloalkyl group, alkoxy group or phenyl group, and at least one of $R^{13}$'s is a radically polymerizable group or organic group containing a radically polymerizable group.

Examples of the radically polymerizable group and the organic group containing a radically polymerizable group represented by $R^{13}$ include (meth)acrylic group; organic groups having a (meth)acrylic group such as (meth)acryloyloxypropyl group and (3-(meth)acryloyloxypropyl)dimethylsiloxy group; allyl group; organic groups having an allyl group such as allylpropyl group and allylpropyldimethylsiloxy group; vinyl group; and organic groups having a vinyl group such as vinylpropyl group and vinyldimethylsiloxy group.

Other radically polymerizable monomers except for (C1) to (C4) enumerated above may also be used in this invention.

The other radically polymerizable monomers include γ-methacryloyloxypropyl trimethoxysilane and γ-methacryloyloxypropylmethyl dimethoxysilane.

(C2) Epoxy-Based Polymerizable Monomer;

This polymerizable monomer has an epoxy group in the molecule as a polymerizable group and is particularly preferred when a hydroxyl group, $NH_2$ group or NCO group is introduced into the side chain of the polyrotaxane (A) as a polymerizable functional group.

Epoxy-based polymerizable monomers are roughly divided into aliphatic epoxy compounds, alicyclic epoxy compounds and aromatic epoxy compounds exemplified by the following compounds.

Aliphatic epoxy compounds; ethylene oxide, 2-ethyl oxirane, butyl glycidyl ether, phenyl glycidyl ether, 2,2'-methylene bisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, diglycidyl ethers of tris(2-hydroxyethyl)isocyanurate and triglycidyl ethers of tris(2-hydroxyethyl)isocyanurate Alicyclic epoxy compounds; isophoronediol diglycidyl ether and bis-2,2-hydroxycyclohexylpropane diglycidyl ether Aromatic epoxy compounds; resorcin diglycidyl ether, bisphenol A diglycidyl ether, bisphenol F diglycidyl ether, bisphenol S diglycidyl ether, orthophthalic acid diglycidyl esters, phenol novolak polyglycidyl ether and cresol novolak polyglycidyl ether Besides the above monomers, epoxy-based polymerizable monomers having a sulfur atom in the molecule in addition to an epoxy group may be used. The sulfur atom-containing epoxy-based polymerizable monomers contribute to the improvement of refractive index in particular and are divided into linear aliphatic and cyclic aliphatic types exemplified by the following monomers.

Linear aliphatic sulfur atom-containing epoxy-based polymerizable monomers; bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthio) propane, and 2,2-bis(2,3-epoxypropylthiomethyl)-1-(2,3-epoxypropylthio)butane.

Cyclic aliphatic sulfur atom-containing epoxy-based polymerizable monomers; 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis(<2-(2,3-epoxypropylthio)ethyl>thiomethyl)-1,4-dithiane, and 2,5-bis(2,3-epoxypropylthiomethyl)-2,5-dimethyl-1,4-dithiane (C3) Urethane- or Urea-Based Polymerizable Monomer;

This polymerizable monomer is such that a polymerization recurring unit is linked by means of a urethane bond or urea bond and effective when a polymerizable functional group such as epoxy group, episulfide group, thietanyl group, OH group, SH group, $NH_2$ group, NCO group or NCS group is introduced into the side chain of the polyrotaxane (A).

For example, the urethane bond is formed by a reaction between a polyol and a polyisocyanate and includes a thiourethane bond formed by a reaction between a polyol and a polyisothiocyanate or a reaction between a polythiol and a polyisocyanate.

The urea bond is formed by a reaction between a polyamine and a polyisocyanate and includes a thiourea bond formed by a reaction between a polyamine and a polyisothiocyanate.

As understood from the above explanation, in this invention, a plurality of compounds are selected from among polyols (C3-1), polythiols (C3-2), polyamines (C3-3), polyisocyanates (C3-4) and polyisothiocyanates (C3-5) and used as the urethane- or urea-based polymerizable monomers to ensure that the above urethane bond (thiourethane bond) or the urea bond (thiourea bond) is formed.

When a hydroxyl group, mercapto group (SH group), $NH_2$ group or NCO group is introduced into the side chain of the above-described polyrotaxane as a polymerizable group, the side chain is incorporated into a polymerization chain formed by the urethane- or urea-based polymerizable monomer advantageously.

The following compounds may be used as one of the urethane- or urea-based polymerizable monomers.

(C3-1) Polyols;

The polyols are compounds having two or more OH groups in one molecule, typified by di-, tri-, tetra-, penta- and hexa-hydroxy compounds, polyesters containing two or more OH groups in one molecule (polyester polyols), polyethers containing two or more OH groups in one molecule (to be referred to as "polyether polyols" hereinafter), polycarbonates containing two or more OH groups in one molecule (polycarbonate polyols), polycaprolactones containing two or more OH groups in one molecule (polycaprolactone polyols) and acrylic polymers containing two or more OH groups in one molecule (polyacrylic polyols).

Examples of these compounds are given below.

Aliphatic alcohols; ethylene glycol, diethylene glycol, propylene glycol, dipropylene glycol, butylene glycol, neopentyl glycol, glycerin, trimethylol ethane, trimethylol propane, butane triol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexane triol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexane dimethanol, hydroxypropyl cyclohexanol, tricyclo[5,2,1,0,2,6]decane-dimethanol, bicyclo[4,3,0]-nonanediol, dicyclohexanediol, tricyclo[5,3,1,1]dodecanediol, bicyclo[4,3,0] nonane dimethanol, tricyclo[5,3,1,1]dodecane-diethanol, hydroxypropyl tricyclo[5,3,1,1]dodecanol, spiro[3,4]octanediol, butyl cyclohexanediol, 1,1'-bicyclohexylidene diol, cyclohexane triol, maltitol and lactitol Aromatic alcohols; dihydroxy naphthalene, trihydroxy naphthalene, tetrahydroxy naphthalene, dihydroxybenzene, benzene triol, biphenyl tetraol, pyrogallol, (hydroxynaphthyl)pyrogallol, trihydroxy phenanthrene, bisphenol A, bisphenol F, xylylene glycol and tetrabromobisphenol A Sulfur-containing polyols; bis-[4-(hydroxyethoxy)phenyl] sulfide, bis[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis[2-methyl-4-(hydroxyethoxy)-6-butylphenyl]sulfide, compounds prepared by adding an average of 3 or less molecules per hydroxyl group of ethylene oxide and/or propylene oxide to the above sulfur-containing polyols, di-(2-hydroxyethyl) sulfide, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone, tetrabromobisphenol S, tetramethylbisphenol S, 4,4'-thiobis(6-tert-butyl-3-methyl phenol) and 1,3-bis(2-hydroxyethylthioethyl)-cyclohexane Polyester polyols; compounds obtained by a condensation reaction between a polyol and a polybasic acid Polyether polyols; compounds obtained by a reaction between a compound having two or more active hydrogen-containing groups in the molecule and alkylene oxide and modified products thereof Polycaprolactone polyols; compounds obtained by the ring-opening polymerization of s-caprolactone Polycarbonate polyols; compounds obtained by phosgenating at least one low-molecular weight polyol, and compounds obtained by a transesterification method using ethylene carbonate, diethyl carbonate or diphenyl carbonate Polyacrylic polyols; compounds obtained by the copolymerization of an acrylic acid ester or methacrylic acid ester containing a hydroxyl group and a monomer copolymerizable with these esters (C3-2) Polythiols;

The polythiols are compounds having two or more SH groups in one molecule, exemplified by the following compounds.

Aliphatic polythiols; methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexane dithiol, 1,2-cyclohexane dithiol, 2,2-dimethylpropane-1,3-dithiol, 3,4-dimethoxybutane-1,2-dithiol, 2-methylcyclohexane-2,3-dithiol, bicyclo[2,2,1]hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol(2-mercaptoacetate), 2,3-dimercapto-1-propanol(3-mercaptoacetate), diethylene glycol bis(2-mercaptoacetate), diethylene glycol bis(3-mercaptopropionate), 1,2-dimercaptopropylmethylether, 2,3-dimercaptopropylmethyl ether, 2,2-bis(mercaptomethyl)-1,3-propane dithiol, bis(2-mercaptoethyl) ether, ethylene glycol bis(2-mercaptoacetate), ethylene glycol bis(3-mercaptopropionate), 1,4-bis(3-mercaptobutyryloxy)butane, 1,4-butanediol bis(3-mercaptopropionate), 1,4-butanediol-bis(thioglycolate), 1,6-hexanediol-bis(thioglycolate), tetraethylene glycol bis(3-mercaptopropionate), trimethylolpropane tris(2-mecaptoacetate), trimethylolpropane tris(3-mercaptopropionate), trimethylolethane tris(3-mercaptobutyrate), trimethylolpropane tris(3-mercaptobutyrate), pentaerythritol tetrakis(2-mercaptoacetate), pentaerythritol tetrakis(3-mercaptopropionate), 1,2-bis(2-mercaptoethylthio)-3-mercaptopropane, dipentaerythritol hexakis(3-mercaptopropionate), pentaerythritol tetrakis(3-mercaptobutyrate), 1,4-bis(3-mercaptobutyryloxy)butane, trimethylolpropane tris(3-mercaptobutyrate), trimethylolethane tris(3-mercaptobutyrate), 1,2-bis[(2-mercaptoethyl) thio]-3-mercaptopropane, 2-mercaptomethyl-1,3-propanedithiol, 2-mercaptomethyl-1,4-butanedithiol, 2,4,5-tris(mercaptomethyl)-1,3-dithiolane, 2,2-bis(mercaptomethyl)-1,4-butanedithiol, 4,4-bis(mercaptomethyl)-3,5-dithiaheptane-1,7-dithiol, 2,3-bis(mercaptomethyl)-1,4-butanedithiol, 2,6-bis(mercaptomethyl)-3,5-dithiaheptane-1,7-dithiol, 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and 4-mercaptomethyl-1,8-dimercapto-3,6-dithiaoctane Aromatic polythiols; 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)

benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethoxy)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalene dithiol, 1,5-naphthalene dithiol, 2,6-naphthalene dithiol, 2,7-naphthalene dithiol, 2,4-dimethylbenzene-1,3-dithiol, 4,5-dimethylbenzene-1,3-dithiol, 9,10-anthracenedimethane thiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and 1,4-bis(mercaptopropylthiomethyl)benzene Halogen-substituted aromatic polythiols; 2,5-dichlorobenzene-1,3-dithiol, 1,3-di(p-chlorophenyl)propane-2,2-dithiol, 3,4,5-tribromo-1,3-dimercaptobenzene and 2,3,4,6-tetrachloro-1,5-bis(mercaptomethyl)benzene Heterocyclic polythiols; 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and 1,3,5-tris(3-mercaptobutyryloxyethyl)-1,3,5-triazine-2,4,6-(1H,3H,5H)trione Aromatic polythiols containing a sulfur atom in addition to a mercapto group; 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene and nuclear alkylated products of the above polythiols Aliphatic polythiols containing a sulfur atom in addition to a mercapto group; bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mecaptoethylthio)-3-mercaptopropane, 2-mercaptoethylthio-2,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide, bis(mercaptopropyl)disulfide, thioglycolic acid or mercaptopropionic acid esters of the above compounds, hydroxymethylsulfide bis(2-mercaptoacetate), hydroxyethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), 2,5-bis(mercaptomethyl)-1,4-dithiane, 2,5-bis(2-mercaptoethyl)-1,4-dithiane, 2,5-bis(3-mercaptopropyl)1,4-dithiane, 2-(2-mercaptoethyl)-5-mercaptomethyl-1,4-dithiane, 2-(2-mercaptoethyl)-5-(3-mercaptopropyl)-1,4-dithiane, 2-mercaptomethyl-5-(3-mercaptopropyl)-1,4-dithiane, thioglycolic acid bis(mercaptoethyl ester), thiodipropionic acid bis(2-mercaptoethyl ester), 4,4'-thiodibutyric acid bis(2-mercaptoethyl ester), dithiodiglycolic acid bis(2-mercaptoethyl ester), dithiodipropionic acid bis(2-mercaptoethyl ester), 4,4'-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid (2,3-dimercaptopropyl ester) and dithiodipropionic acid (2,3-dimercaptopropyl ester)

Heterocyclic polythiols containing a sulfur atom in addition to a mercapto group; 3,4-thiophene dithiol, tetrahydrothiophene-2,5-dimercaptomethyl and 2,5-dimercapto-1,3,4-thiadiazole Polythiols containing an isocyanurate group; 1,2-bis[(2-mercaptoethyl)thio]-3-mercaptopropane-tris{(3-mercaptopropionyloxy)-ethyl}isocyanurate and 1,3,5-tris(3-mercaptobutyryloxyethyl)-1,3,5-triazine-2,4,6(1H,3H,5H)-trione-tris-[(3-mercaptopropionyloxy)-ethyl]-isocyanurate (C3-3) Polyamines;

The polyamines are compounds having two or more NH$_2$ groups in one molecule, exemplified by the following compounds. Ethylene diamine, hexamethylene diamine, isophorone diamine, nonamethylene diamine, undecamethylene diamine, dodecamethylene diamine, metaxylene diamine, 1,3-propane diamine, putrescine, 2-(2-aminoethylamino)ethanol, diethylene triamine, p-phenylene diamine, m-phenylene diamine, melamine and 1,3,5-benzene triamine (C3-4) Polyisocyanates;

The polyisocyanates are compound having two or more NCO groups in one molecule, exemplified by the following compounds.

Aliphatic isocyanates; ethylene diisocyanate, trimethylene diisocyanate, tetramethylene diisocyanate, hexamethylene diisocyanate, octamethylene diisocyanate, nanomethylene diisocyanate, 2,2'-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanate methyl octane, 2,5,7-trimethyl-1,8-diisocyanate-5-isocyanate methyl octane, bis(isocyanateethyl)carbonate, bis(isocyanateethyl)ether, 1,4-butylene glycol dipropyl ether-ω,ω'-diisocyanate, lysine diisocyanate methyl ester, lysine triisocyanate, 2-isocyanateethyl-2,6-diisocyanate hexanoate and 2-isocyanatepropyl-2,6-diisocyanate hexanoate Alicyclic isocyanates; isophorone diisocyanate, norbornane diisocyanate, bis(isocyanatemethyl)cyclohexane, dicyclohexylmethane diisocyanate, cyclohexane diisocyanate, methyl cyclohexane diisocyanate, dicyclohexyldimethylmethane diisocyanate, 2,2'-dimethyl dicyclohexylmethane diisocyanate, bis(4-isocyanate-n-butylidene)pentaerythritol dimer acid diisocyanate, 2-isocyanatemethyl-3-(3-isocyanatepropyl)-5-isocyanatemethyl-bicyclo[2,2,1]-heptane, 2-isocyanatemethyl-3-(3-isocyanatepropyl)-6-isocyanatemethyl-bicyclo[2,2,1]-heptane, 2-isocyanatemethyl-2-(3-isocyanatepropyl)-5-isocyanatemethyl-bicyclo[2,2,1]-heptane, 2-isocyanatemethyl-2-(3-isocyanatepropyl)-6-isocyanatemethyl-bicyclo[2,2,1]-heptane, 2-isocyanatemethyl-3-(3-isocyanatepropyl)-6-(2-isocyanateethyl)-bicyclo[2,2,1]-heptane, 2-isocyanatemethyl-3-(3-isocyanatepropyl)-6-(2-isocyanateethyl)-bicyclo[2,1,1]-heptane, 2-isocyanatemethyl-2-(3-isocyanatepropyl)-5-(2-isocyanateethyl)-bicyclo[2,2,1]-heptane, 2-isocyanatemethyl-2-(3-isocyanatepropyl)-6-(2-isocyanateethyl)-bicyclo[2,2,1]-heptane and 1,3,5-tris(isocyanatemethyl)cyclohexane Aromatic isocyanates; xylylene diisocyanate, bis(isocyanateethyl)benzene, bis(isocyanatepropyl)benzene, α,α,α',α'-tetramethylxylylene diisocyanate, bis(isocyanatebutyl)benzene, bis(isocyanatemethyl)naphthalene, bis(isocyanatemethyl)diphenyl ether, bis(isocyanateethyl)phthalate, mesitylene triisocyanate, 2,6-di(isocyanatemethyl)furane, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatephenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyl-diphenylmethane-3,5,2',4',6'-pentaisocyanate, phenyl isocyanate methyl isocyanate, phenyl isocyanate ethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethyl carbazole diisocyanate and dichlorocarbazole diisocyanate Sulfur-containing aliphatic isocyanates; thiodiethyl diisocyanate, thiodipropyl diisocyanate, thiodihexyl diisocyanate, dimethyl sulfone diisocyanate, dithiodimethyl diisocyanate, dithiodiethyl diisocyanate, dithiodipropyl diisocyanate, dicyclohexyl sulfide-4,4'-diisocyanate, 1-isocyanatemethylthio-2,3-bis(2-isocyanatoethylthio)propane, 1,2-bis(2-isocyanatoethylthio)ethane, 1,1,2,2-tetrakis(isocyanatomethylthio)ethane, 2,2,5,5-tetrakis(isocyanatomethylthio)-1,4-dithiane, 2,4-dithiapentane-1,3-diisocyanate, 2,4,6-trithiaheptane-3,5-diisocyanate, 2,4,7,9-tetrathiapentane-5,6-diisocyanate and bis(isocyanatomethylthio)phenyl methane Aliphatic sulfide-based isocyanates; bis[2-(isocyanatomethylthio)ethyl]sulfide Aromatic sulfide-based isocyanates; diphenylsulfide-2,4-diisocyanate, diphenylsulfide-4,4'-diisocyanate, 3,3'-dimethoxy-4,4'-diisocyanate dibenzyl thioether, bis(4-isocyanatemethylbenzene)sulfide and 4,4'-methoxybenzene thioethylene glycol-3,3'-diisocyanate Aromatic disulfide-based isocyanates; diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate Aromatic sulfone-based isocyanates; diphenylsulfone-4,4'-diisocyanate, diphenylsulfone-3,3'-diisocyanate, benzylidenesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanate dibenzylsulfone, 4,4'-dimethyldiphenylsulfone-3,3'-diisocyanate, 4,4'-di-tert-butyldiphenylsulfone-3,3'-diisocyanate, 4,4'-dimethoxybenzeneethylenedisulfone-3,3'-diisocyanate and 4,4'-dichlorodiphenylsulfone-3,3'-diisocyanate Sulfonic acid ester-based isocyanates; 4-methyl-3-isocyanatebenzenesulfonyl-4'-isocyanatephenol ester and 4-methoxy-3-isocyanatebenzenesulfonyl-4'-isocyanatephenol ester Aromatic sulfonic acid amide-based isocyanates; 4-methyl-3-isocyanatebenzenesulfonylanilide-3'-methyl-4'-isocyanate, dibenzenesulfonyl-ethylenediamine-4,4'-diisocyanate, 4,4'-dimethoxybenzenesulfonyl-ethylenediamine-3,3'-diisocyanate and 4-methyl-3-isocyanatebenzenesulfonylanilide-4-methyl-3'-isocyanate Sulfur-containing heterocyclic isocyanates; thiophene-2,5-diisocyanate, thiophene-2,5-diisocyanate methyl, 1,4-dithiane-2,5-diisocyanate, 1,4-dithiane-2,5-diisocyanate methyl, 1,3-dithiolane-4,5-diisocyanate, 1,3-dithiolane-4,5-diisocyanate methyl, 1,3-dithiolane-2-methyl-4,5-diisocyanate methyl, 1,3-dithiolane-2,2-diisocyanate ethyl, tetrahydrothiophene-2,5-diisocyanate, tetrahydrothiophene-2,5-diisocyanate methyl, tetrahydrothiophene-2,5-diisocyanate ethyl and tetrahydrothiophene-3,4-diisocyanate methyl Further, halogen, alkyl, alkoxy and nitro substitution products, polyhydric alcohol prepolymer type modified, carbodiimide-modified, urea-modified and biuret-modified products, and dimerized and trimerized reaction products of the above polyisocyanates may also be used.

(C3-5) Polyisothiocyanates;

The polyisothiocyanates are compounds having two or more NCS groups in one molecule, exemplified by the following compounds.

Aliphatic isothiocyanates; 1,2-diisothiocyanate ethane, 1,3-diisothiocyanate propane, 1,4-diisothiocyanate butane, 1,6-diisothiocyanate hexane and p-phenylene diisopropylidene diisothiocyanate Alicyclic isothiocyanates; cyclohexyl isothiocyanate and cyclohexane diisothiocyanate Aromatic isothiocyanates; phenyl isothiocyanate, 1,2-diisothiocyanate benzene, 1,3-diisothiocyanate benzene, 1,4-diisothiocyanate benzene, 2,4-diisothiocyanate toluene, 2,5-diisothiocyanate m-xylene diisocyanate, 4,4'-diisothiocyanate 1,1'-biphenyl, 1,1'-methylenebis(4-isothiocyanatebenzene), 1,1'-methylenebis(4-isothiocyanate 2-methylbenzene), 1,1'-methylenebis(4-isothiocyanate 3-methylbenzene), 1,1'-(1,2-ethanediyl)bis(4-isothiocyanatebenzene), 4,4'-diisothiocyanate benzophenone, 4,4'-diisothiocyanate 3,3'-dimethylbenzophenone, benzanilide-3, 4'-diisothiocyanate, diphenyl ether-4,4'-diisothiocyanate and diphenylamine-4,4'-diisothiocyanate Heterocyclic isothiocyanates—2,4,6-triisothiocyanate 1,3,5-triazine Carbonyl isothiocyanates; hexanedioyl diisothiocyanate, nonanedioyl diisothiocyanate, carbonic acid diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate Further, polyfunctional isothiocyanates having at least one sulfur atom in addition to the sulfur atom of an isothiocyanate group may also be used. The following compounds are examples of the polyfunctional isothiocyanates.

Sulfur-containing aliphatic isothiocyanates; thiobis(3-isothiocyanatepropane), thiobis(2-isothiocyanateethane) and dithiobis(2-isothiocyanateethane)

Sulfur-containing aromatic isothiocyanates; 1-isothiocyanate 4-{(2-isothiocyanate)sulfonyl}benzene, thiobis(4-isothiocyanatebenzene), sulfonyl bis(4-isothiocyanatebenzene), sulfinyl bis(4-isothiocyanatebenzene), dithiobis(4-isothiocyanatebenzene), 4-isothiocyanate 1-{(4-isothiocyanatephenyl)sulfonyl}-2-methoxy-benzene, 4-methyl-3-isothiocyanatebenzenesulfonyl-4'-isothiocyanatephenyl ester and 4-methyl-3-isothiocyanatebenzenesulfonylanilide-3'-methyl-4'-isothiocyanate Sulfur-containing heterocyclic isothiocyanates; thiophene-2,5-diisothiocyanate and 1,4-dithiane-2,5-diisothiocyanate The above-described urethane- or urea-based polymerizable monomers (C3) are used in combination to form a urethane bond or urea bond by polymerization.

(C4) Another Polymerizable Monomer;

In this invention, besides the above-described polymerizable monomers (C1) to (C3), an episulfide-based polymerizable monomer (C4-1) or a thietanyl-based polymerizable monomer (C4-2) may be used to improve the refractive index, and a monofunctional polymerizable monomer (C4-3) may be used to improve photochromic properties. Further, a composite polymerizable monomer (C4-4) having different types of polymerizable groups in the molecule may also be used.

(C4-1) Episulfide-Based Polymerizable Monomer;

This polymerizable monomer is a compound having two or more episulfide groups in the molecule and particularly preferred when an SH group is introduced into the side chain of the polyrotaxane (A) as a polymerizable functional group. The following compounds are examples of this polymerizable monomer.

Bis(1,2-epithioethyl)sulfide,
bis(1,2-epithioethyl)disulfide,
bis(2,3-epithiopropyl)sulfide,
bis(2,3-epithiopropylthio)methane,
bis(2,3-epithiopropyl)disulfide,
bis(2,3-epithiopropyldithio)methane,
bis(2,3-epithiopropyldithio)ethane,
bis(6,7-epithio-3,4-dithiaheptyl)sulfide,
bis(6,7-epithio-3,4-dithiaheptyl)disulfide,
1,4-dithiane-2,5-bis(2,3-epithiopropyldithiomethyl),
1,3-bis(2,3-epithiopropyldithiomethyl)benzene,
1,6-bis(2,3-epithiopropyldithiomethyl)-2-(2,3-epithiopropyldithioethylthio)-4-thiahexane,
1,2,3-tris(2,3-epithiopropyldithio)propane,
1,1,1,1-tetrakis(2,3-epithiopropyldithiomethyl)methane,
1,3-bis(2,3-epithiopropyldithio)-2-thiapropane,
1,4-bis(2,3-epithiopropyldithio)-2,3-dithiabutane,
1,1,1-tris(2,3-epithiopropyldithio)methane,
1,1,1-tris(2,3-epithiopropyldithiomethylthio)methane,
1,1,2,2-tetrakis(2,3-epithiopropyldithio)ethane,
1,1,2,2-tetrakis(2,3-epithiopropyldithiomethylthio)ethane,
1,1,3,3-tetrakis(2,3-epithiopropyldithio)propane,
1,1,3,3-tetrakis(2,3-epithiopropyldithiomethylthio)propane,
2-[1,1-bis(2,3-epithiopropyldithio)methyl]-1,3-dithietane and
2-[1,1-bis(2,3-epithiopropyldithiomethylthio)methyl]-1,3-dithietane (C4-2) Thietanyl-Based Polymerizable Monomer;

This polymerizable monomer is effective when an SH group is introduced into the side chain of the polyrotaxane (A) as a polymerizable functional group and a thietane compound having 2 or more thietanyl groups in the molecule. Part of the thietanyl-based polymerizable monomer has an episulfide group in addition to a plurality of thietanyl groups, and this type of monomers are enumerated in the paragraph for the above episulfide-based polymerizable monomer. Other thietanyl-based polymerizable monomers include metal-containing thietane compounds having a metal atom in the molecule and nonmetallic thietane compounds containing no metal.

Nonmetallic thietane compounds; Bis(3-thietanyl)disulfide, bis(3-thietanyl)sulfide, bis(3-thietanyl)trisulfide, bis(3-thietanyl)tetrasulfide, 1,4-bis(3-thietanyl)-1,3,4-trithiabutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanyl)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bisthietanyl sulfide, bis(thietanylthio)methane, 3-[<thietanylthio]methylthio>methylthio}thietane, bisthietanyl disulfide, bisthietanyl trisulfide, bisthietanyl tetrasulfide, bisthietanyl pentasulfide, 1,4-bis(3-thietanyldithio)-2,3-dithiabutane, 1,1,1-tris(3-thietanyldithio)methane, 1,1,1-tris(3-thietanyldithiomethylthio)methane, 1,1,2,2-tetrakis(3-thietanyldithio)ethane and 1,1,2,2-tetrakis(3-thietanyldithiomethylthio)ethane Metal-Containing Thietane Compounds;

The thietane compounds contain a group 14 element such as Sn atom, Si atom, Ge atom or Pb atom; group 4 element such as Zr atom or Ti atom; group 13 element such as Al atom; or group 12 element such as Zn atom as a metal atom in the molecule. The following compounds are particularly preferably used.

Alkylthio(thietanylthio)tins;
methylthiotris(thietanylthio)tin,
ethylthiotris(thietanylthio)tin,
propylthiotris(thietanylthio)tin and
isopropylthiotris(thietanylthio)tin
Bis(alkylthio)bis(thietanylthio)tins;
bis(methylthio)bis(thietanylthio)tin,
bis(ethylthio)bis(thietanylthio)tin,
bis(propylthio)bis(thietanylthio)tin and
bis(isopropylthio)bis(thietanylthio)tin
Alkylthio(alkylthio)bis(thietanylthio)tins;
ethylthio(methylthio)bis(thietanylthio)tin,
methylthio(propylthio)bis(thietanylthio)tin,
isopropylthio(methylthio)bis(thietanylthio)tin,
ethylthio(propylthio)bis(thietanylthio)tin, ethylthio(isopropylthio)bis(thietanylthio)tin and isopropylthio(propylthio)bis(thietanylthio)tin Bis(thietanylthio) cyclic dithiotin compounds; bis(thietanylthio)dithiastannetane, bis(thietanylthio)dithiastannolane, bis(thietanylthio)dithiastanninane and bis(thietanylthio)dithiastannocane Alkyl(thietanylthio)tin compounds; methyl tris(thietanylthio)tin, dimethyl bis(thietanylthio)tin, butyl tris(thietanylthio)tin, tetrakis(thietanylthio)tin, tetrakis(thietanylthio)germanium and tris(thietanylthio)bismuth (C4-3) Monofunctional Polymerizable Monomer;

This monomer is a compound having one OH group in the molecule and used in combination with the above-described polyol to enhance photochromic properties by controlling the molecular weight and the degree of crosslinking. Polyethylene glycol monooleyl ether, polyethylene glycol monomethyl ether, polyoxyethylene lauryl ether, polyoxyethylene alkyl ether, polyoxyethylene 2-ethylhexyl ether, polyoxyethylene tridecyl ether, polyoxyethylene cetyl ether, polyoxyethylene stearyl ether and polyethylene glycol mono-4-octylphenyl ether (C4-4) Composite Polymerizable Monomer;

This polymerizable monomer has different types of polymerizable groups in the molecule, and various physical properties can be controlled by using this polymerizable monomer.

The following compounds are examples of this composite polymerizable monomer.

Radical polymerization/epoxy type polymerizable monomers; glycidyl methacrylate, glycidyloxymethyl methacrylate, 2-glycidyloxyethyl methacrylate, 3-glycidyloxypropyl methacrylate, 4-glycidyloxybutyl methacrylate, polyethylene glycol glycidyl methacrylate, polypropylene glycol glycidyl methacrylate, bisphenol A-monoglycidyl ether-methacrylate and polyethylene glycol glycidyl acrylate Radical polymerization/OH type polymerizable monomers; 2-hydroxy methacrylate, 2-hydroxy acrylate and 2-hydroxypropyl acrylate Radical polymerization/isocyanate type polymerizable monomers; 2-isocyanatoethyl methacrylate and 2-isocyanatoethyl acrylate OH/SH type polymerizable monomers; 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl) methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane mono(salicylate) and hydroxyethylthiomethyl-tris(mercaptoethylthio)methane Out of the above-described polymerizable monomers (C1) to (C4), the radically polymerizable monomer (C1) and the urethane- or urea-based polymerizable monomer (C3) are preferably used in the kneading method, the radically polymerizable monomer (C1) is preferably used in the lamination method, and the urethane- or urea-based polymerizable monomer (C3) is preferably used in the binder method.

(D) Polymerization-Curing Accelerator;

Various polymerization-curing accelerators may be used according to the type of the above-described polymerizable monomer (C) and the type of the polymerizable functional group introduced into the side chain of the polyrotaxane (A) so as to accelerate the polymerization-curing of the photochromic composition of this invention.

For example, when the radically polymerizable monomer (C1) is used and when the radically polymerizable functional group is introduced into the side chain of the polyrotaxane (A), a polymerization initiator (D1) is used as a polymerization-curing accelerator.

When the epoxy-based polymerizable monomer (C2), the episulfide-based polymerizable monomer (C4-1) or the thietanyl-based polymerizable monomer (C4-2) is used and when an epoxy group, episulfide group or thietanyl group is introduced into the side chain of the polyrotaxane (A) as the polymerizable functional group, an epoxy curing agent (D2-1) or a cationic polymerization catalyst (D2-2) for ring-opening polymerizing an epoxy group is used as a polymerization-curing accelerator. Further, when the urethane- or urea-based polymerizable monomer (C3) or another polymerizable monomer (C4) is used and when an OH group, SH group, $NH_2$ group, NCO group or NCS group is introduced into the side chain of the polyrotaxane (A) as the polymerizable functional group, a urethane or urea reaction catalyst (D3-1) or a condensation agent (D3-2) is used as a polymerization-curing accelerator.

(D1) Polymerization Initiator

Polymerization initiators are divided into thermal polymerization initiators and photopolymerization initiators, and examples thereof are given below.

Thermal Polymerization Initiators

Diacyl peroxides; benzoyl peroxide, p-chlorobenzoyl peroxide, decanoyl peroxide, lauroyl peroxide and acetyl peroxide Peroxy esters; t-butylperoxy-2-ethyl hexanate, t-butylperoxy neodecanate, cumyperoxy neodecanate and t-butylperoxy benzoate Percarbonates; diisopropylperoxy dicarbonate and di-sec-butylperoxy dicarbonate Azo compounds; azobisisobutyronitrile Photopolymerization Initiators Acetophenone-based compounds; 1-phenyl-2-hydroxy-2-methylpropan-1-one, 1-hydroxycyclohexylphenyl ketone and 1-(4-isopropylphenyl)-2-hydroxy-2-methylpropan-1-one α-dicarbonyl-based compounds; 1,2-diphenylethanedione and methylphenyl glyoxylate Acylphosphine oxide-based compounds; 2,6-dimethylbenzoyldiphenylphosphine oxide, 2,4,6-trimethylbenzoyldiphenylphosphine oxide, 2,4,6-trimethylbenzoyldiphenyl phosphinic acid methyl ester, 2,6-dichlorobenzoyldiphenylphoshine oxide and 2,6-dimethoxybenzoyldiphenylphosphine oxide When a photopolymerization initiator is used, a known polymerization-curing accelerator aid such as a tertiary amine may be used in combination.

(D2-1) Epoxy Curing Agent

Amine compounds and salts thereof; 2-methylimidazole, 2-ethyl-4-methylimidazole, 1,8-diaza-bicyclo(5,4,0)undecene-7, trimethylamine, benzyl dimethylamine, triethylamine, 2,4,6-tris(dimethylaminomethyl)phenol and 2-(dimethylaminomethyl)phenol Quaternary ammonium salts; tetramethylammonium chloride, benzyltrimethylammonium bromide and tetrabutylammonium bromide Organic phosphine compounds; tetra-n-butylphosphonium benzotriazolate and tetra-n-butylphosphonium-o,o-diethylphosphoro dithioate Metal carboxylic acid salts; chromium (III) tricarboxylate and tin octylate Acetylacetone chelate compounds; chromium acetylacetonate (D2-2) Cationic Polymerization Catalyst
Lewis acid-based catalysts; $BF_3$.amine complex, $PF_5$, $BF_3$, $AsF_5$ and $SbF_5$
Thermosetting cationic polymerization catalysts; phosphonium salts, quaternary ammonium salts, sulfonium salts, benzylammonium salts, benzylpyridinium salts, benzylsulfonium salts, hydrazinium salts, carboxylic acid esters, sulfonic acid esters and amine imides
Ultraviolet curable cationic polymerization catalysts; diaryl iodonium hexafluorophosphate and hexafluoroantimonic acid bis(dodecylphenyl)iodonium
(D3-1) Urethane or Urea Reaction Catalyst This reaction catalyst is used in the formation of a poly(thio)urethane bond caused by a reaction between a polyiso(thia)cyanate and a polyol or polythiol. Examples of this catalyst are given below.
Triethyl diamine, hexamethylene tetramine, N,N-dimethyl octylamine, N,N,N',N'-tetramethyl-1,6-diaminohexane, 4,4'-trimethylenebis(1-methylpiperidine), 1,8-diazabicyclo-(5,4,0)-7-undecene, dimethyltin dichloride, dimethyltin bis(isooctylthioglycolate), dibutyltin dichloride, dibutyltin dilaurate, dibutyltin maleate, dibutyltin maleate polymer, dibutyltin diricinoleate, dibutyltin bis(dodecylmercaptide), dibutyltin bis(isooctylthioglycolate), dioctyltin dichloride, dioctyltin maleate, dioctyltin maleate polymer, dioctyltin bis(butylmaleate), dioctyltin dilaurate, dioctyltin diricinoleate, dioctyltin dioleate, dioctyltin di(6-hydroxy)caproate, dioctyltin bis(isooctylthioglycolate), and didodecyltin diricinoleate, and metal salts such as copper oleate, copper acetylacetonate, iron acetylacetonate, iron naphthenate, iron lactate, iron citrate, iron gluconate, potassium octanoate and 2-ethylhexyl titanate
(D3-2) Condensation Agent
Inorganic acids; hydrogen chloride, hydrogen bromide, sulfuric acid and phosphoric acid
Organic acids; p-toluenesulfonic acid and camphorsulfonic acid
Acidic ion exchange resins; Amberlite and Amberlyst
Carbodiimides; dicyclohexyl carbodiimide and 1-ethyl-3-(3-dimethylaminopyrrolyl)-carbodiimide The above-described polymerization-curing accelerators (D) may be used alone or in combination of two or more, and its amount may be so-called "catalyst amount", for example, 0.001 to 10 parts by mass, specifically 0.01 to 5 parts by mass based on 100 parts by mass of the polymerizable monomer (C).
Other Compounding Components;

As long as the effect of this invention is not impaired, the photochromic composition of this invention may comprise various compounding agents known per se, for example, release agent, ultraviolet absorbent, infrared absorbent, ultraviolet stabilizer, antioxidant, coloring inhibitor, antistatic agent, fluorescent dye, dye, pigment and flavoring agent, additives, solvent, leveling agent and polymerization control agent such as a thiol exemplified by t-dodecyl mercaptan as required.

Particularly when an ultraviolet stabilizer is used, it can improve the durability of the photochromic compound advantageously. As the ultraviolet stabilizer, there are known hindered amine optical stabilizers, hindered phenol antioxidants and sulfur-based antioxidants. Particularly preferred ultraviolet stabilizers are given below. Bis(1,2,2,6,6-pentamethyl-4-piperidyl)sebacate, ADEKA STAB LA-52, LA-57, LA-62, LA-63, LA-67, LA-77, LA-82 and LA-87 of ADEKA Corporation, 2,6-di-t-butyl-4-methyl-phenol, ethylenebis(oxyethylene)bis[3-(5-t-butyl-4-hydroxy-m-tolyl) propionate], and IRGANOX 1010, 1035, 1075, 1098, 1135, 1141, 1222, 1330, 1425, 1520, 259, 3114, 3790, 5057 and 565 of Ciba Specialty Chemicals Co., Ltd.

The amount of the ultraviolet stabilizer is not particularly limited as long as the effect of this invention is not impaired but generally 0.001 to 10 parts by mass, specifically 0.01 to 1 part by mass based on 100 parts by mass of the polyrotaxane (A). Particularly when a hindered amine optical stabilizer is used, it is used in an amount of 0.5 to 30 mol, more preferably 1 to 20 mol, much more preferably 2 to 15 mol based on 1 mol of the photochromic compound (B) in order to prevent the shift of the adjusted developed color as there is a difference in the effect of improving durability according to the type of the photochromic compound.

<Preferred Composition of Photochromic Composition>

In the photochromic composition of this invention which comprises the above-described polyrotaxane (A) and the photochromic compound (B) as essential components, the photochromic compound (B) is generally used in an amount of 0.0001 to 10 parts by mass based on 100 parts by mass of the polyrotaxane (A), and this preferred amount differs according to the development system of photochromic properties.

For example, to develop photochromic properties by the kneading method, the photochromic compound is used in an amount of preferably 0.001 to 2 parts by mass, particularly preferably 0.001 to 1 part by mass, and to develop photochromic properties by the lamination method, the photochromic compound is used in an amount of preferably 0.01 to 7 parts by mass, particularly preferably 0.05 to 0.5 part by mass.

To develop photochromic properties by the binder method, it is used in an amount of preferably 0.5 to 10 parts by mass, particularly preferably 1 to 7 parts by mass.

That is, when the amount of the photochromic compound is too small, it is difficult to develop excellent photochromic properties and when the amount is too large, it is difficult to handle this photochromic composition due to thickening, whereby the development of photochromic properties by desired system may become difficult.

When the polymerizable monomer (C) is used, to suppress a rise in the viscosity of the photochromic composition and to make the polyrotaxane (A) exhibit the effect of improving photochromic properties more effectively, the polyrotaxane (A) and the polymerizable monomer (C) are used in a mass ratio (A:C) of 0.1:99.9 to 50.0:50.0, preferably 2:98 to 15:85.

Further, in this invention, in order to enable the polyrotaxane (A) to exhibit the maximum effect of improving photochromic properties, it is the best to use an OH group and/or an SH group as the polymerizable functional group to be introduced into the side chain of the polyrotaxane (A) and to use the urethane- or urea-based polymerizable monomer (C3), that is, a combination of a polyol (C3-1), polythiol (C3-2), polyamine (C3-3), polyisocyanate (C3-4) and polyisothiocyanate (C3-5) as the polymerizable monomer (C) so that a urethane bond, thiourethane bond, urea bond or thiourea bond (especially, a urethane bond or thiourethane bond) is formed.

In this case, the amounts of the SH group and the OH group are each 0.8 to 1.2 mol, particularly preferably 0.85 to 1.15 mol, most preferably 0.9 to 1.1 mol based on 1 mol of the NCO group or NCS group.
<Use of Photochromic Composition>

The photochromic composition of this invention may be used as a composition comprising only two components consisting of the above-described polyrotaxane (A) and photochromic compound (B). For example, the polyrotaxane (A) and the photochromic compound (B) are melt kneaded together to prepare the photochromic composition which is then molded into a sheet to form a photochromic sheet.

Or, the above photochromic composition is dispersed or dissolved in an organic solvent to prepare a coating solution which is then applied to a transparent optical sheet or optical film and dried to form a photochromic coating layer, thereby making it possible to develop photochromic properties.

However, it is preferred that the photochromic composition of this invention should comprise the polymerizable monomer (C) and the polymerization-curing accelerator (D) in addition to the polyrotaxane (A) and the photochromic compound (B). For example, it is desired that these components should be melt kneaded together to prepare the photochromic composition and the composition should be polymerization-cured to produce a photochromic cured body, thereby developing photochromic properties with this cured body.

Polymerization-curing for the production of the photochromic cured body is carried out by performing radical polymerization, ring-opening polymerization, anionic polymerization or polycondensation under the application of active energy rays such as ultraviolet, α, β or γ rays, heating or both of them. That is, suitable polymerization means should be employed according to the types of the polymerizable monomer (C) and the polymerization-curing accelerator (D) and the form of the photochromic cured body to be produced.

To thermally polymerize the photochromic composition of this invention comprising the polymerizable monomer (C), temperature in particular affects the properties of the obtained photochromic cured body. Since this temperature condition is affected by the type and amount of the thermal polymerization initiator and the type of the polymerizable monomer, it cannot be limited unconditionally. In general, a method in which polymerization is started at a relatively low temperature and then the temperature is raised slowly is preferred. Since the polymerization time differs according to various factors like temperature, the optimum time is preferably determined according to these conditions. In general, it is preferred to choose conditions under which polymerization is completed in 2 to 48 hours. To obtain a photochromic laminated sheet, it is preferred that polymerization should be carried out at a temperature at which a reaction between polymerizable functional groups proceeds and that the optimum temperature and the optimum time for obtaining a target molecular weight should be determined at that time.

Further, to photopolymerize the photochromic composition of this invention, UV intensity out of polymerization conditions affects the properties of the obtained photochromic cured body. Since this illuminance condition is affected by the type and amount of the photopolymerization initiator and the type of the polymerizable monomer, it cannot be limited unconditionally. In general, it is preferred to choose conditions ensuring that 50 to 500 mW/cm$^2$ UV light having a wavelength of 365 nm is applied for 0.5 to 5 minutes.

When photochromic properties are to be developed by the kneading method utilizing the above polymerization-curing, the above photochromic composition is injected into the space between glass molds held by an elastomer gasket or spacer to carry out cast polymerization by heating in an air furnace or applying active energy rays such as ultraviolet rays according to the types of the polymerizable monomer (C) and the polymerization-curing accelerator, thereby making it possible to obtain a photochromic cured body which is molded in an optical material form such as a lens.

According to this method, a spectacle lens having photochromic properties is obtained directly.

When photochromic properties are to be developed by the lamination method, a photochromic layer composed of a photochromic cured body is formed on the surface of an optical substrate by dissolving the photochromic composition in a suitable organic solvent to prepare a coating solution, applying the coating solution to the surface of the optical substrate such as a lens substrate by spin coating or dipping, drying it to remove the organic solvent and then carrying out polymerization-curing by UV irradiation or heating in an inert gas such as nitrogen (coating method).

Further, a photochromic layer composed of a photochromic cured body may also be formed on the surface of an optical substrate by arranging the optical substrate such as a lens substrate in such a manner that it is opposed to a glass mold so that a predetermined space is formed between them, injecting the photochromic composition into this space and carrying out cast polymerization with an inner mold for carrying out polymerization-curing by UV irradiation or heating in this state (cast polymerization method).

When the photochromic layer is to be formed on the surface of the optical substrate by the above lamination method (coating method and cast polymerization method), adhesion between the photochromic layer and the optical substrate can be enhanced by subjecting the surface of the optical substrate to a chemical treatment with an alkali solution or acid solution or a physical treatment such as corona discharge, plasma discharge or polishing in advance. As a matter of course, a transparent adhesive resin layer may be formed on the surface of the optical substrate.

Further, when photochromic properties are to be developed by the binder method, a photochromic laminate comprising a photochromic layer as an adhesive layer is obtained by forming a photochromic sheet by the sheet molding of the photochromic composition, sandwiching this between two transparent sheets (optical sheets) and carrying out the above-described polymerization-curing.

In this case, to form the photochromic sheet, coating means using a coating solution prepared by dissolving the photochromic composition in an organic solution may also be employed.

The photochromic laminate manufactured as described above is, for example, mounted in a mold and then a thermoplastic resin (for example, polycarbonate) for an optical substrate such as a lens is injection molded to obtain an optical substrate such as a lens having a predetermined shape and provided with photochromic properties. The photochromic laminate may also be bonded to the surface of an optical substrate with an adhesive, thereby making it possible to obtain a photochromic lens.

When the photochromic laminate is to be manufactured as described above, preferably a urethane- or urea-based polymerizable monomer (C3), particularly preferably a urethane-based monomer is used as the polymerizable monomer (C) to form polyurethane as it has high adhesion to an optical substrate.

The above-described photochromic composition of this invention can develop excellent photochromic properties such as color optical density and fading speed and is effectively used in the production of an optical substrate provided with photochromic properties, for example, a photochromic lens without reducing characteristic properties such as mechanical strength.

According to use purpose, the photochromic layer and the photochromic cured body formed from the photochromic composition of this invention can be subjected to a post-treatment such as dying with a dye such as a dispersion dye, the formation of a hard coating film by using a silane coupling agent or hard coating agent comprising sol of silicon, zirconium, antimony, aluminum, tin or tungsten as the main component, the formation of a thin film by the vapor deposition of a metal oxide such as $SiO_2$, $TiO_2$ or $ZrO_2$, an antireflection treatment with a thin film formed by applying an organic polymer, or an antistatic treatment.

EXAMPLES

The following examples are provided for the purpose of further illustrating the present invention but are in no way to be taken as limiting.
<Synthesis of Polyrotaxane (A) Having Polymerizable Functional Group-Introduced Side Chain>
(1-1) Preparation of PEG-COOH;
Linear polyethylene glycol (PEG) having a molecular weight of 35,000 was prepared as a polymer for forming an axial molecule.
Formulation;
10 g of PEG, 100 mg of TEMPO (2,2,6,6-tetramethyl-1-piperidinyloxy radical) and 1 g of sodium bromide were dissolved in 100 mL of water.
5 mL of a commercially available sodium hypochlorite aqueous solution (effective chlorine concentration of 5%) was added to this solution and stirred at room temperature for 10 minutes. Thereafter, ethanol was added in an amount of up to 5 mL to terminate a reaction.
After extraction was carried out by using 50 mL of methylene chloride, methylene chloride was distilled off, the obtained extract was dissolved in 250 mL of ethanol, and reprecipitation was carried out at −4° C. over 12 hours to collect PEG-COOH which was then dried.
(1-2) Preparation of Polyrotaxane;
3 g of PEG-COOH prepared above and 12 g of α-cyclodextrin (α-CD) were each dissolved in 50 mL of 70° C. hot water, and the obtained solutions were mixed together well by shaking.
Then, this mixed solution was reprecipitated at a temperature of 4° C. for 12 hours, and the precipitated clathrate complex was freeze dried to be collected.
Thereafter, 0.13 g of adamantaneamine was dissolved in 50 ml of dimethyl formamide (DMF) at room temperature, and the above clathrate complex was added to and mixed well with the resulting solution by shaking quickly.
Subsequently, a solution prepared by dissolving 0.38 g of a BOP reagent {benzotriazol-1-yl-oxy-tris(dimethylamino) phosphonium hexafluorophosphate} in DMF was further added and mixed well by shaking.
Further, a solution prepared by dissolving 0.14 ml of diisopropylethylamine in DMF was added and mixed well by shaking to obtain a slurry reagent.
The slurry reagent obtained above was left to stand at 4° C. for 12 hours.
Thereafter, 50 ml of a mixed solvent of DMF and methanol (volume ratio of 1/1) was added to and mixed with the above reagent, and the supernatant was thrown away by centrifugation.
After cleaning was carried out with the above DMF/methanol mixed solution, cleaning and centrifugation were carried out by using methanol to obtain a precipitate.

The obtained precipitate was vacuum dried and then dissolved in 50 mL of DMSO, and the obtained transparent solution was added dropwise to 700 mL of water to precipitate polyrotaxane.
The precipitated polyrotaxane was collected by centrifugation and vacuum dried.
The polyrotaxane was further dissolved in DMSO and precipitated in water, and the obtained precipitate was collected and dried to obtain purified polyrotaxane. The clathration amount of α-CD was 0.25.
The clathration amount was calculated by dissolving the polyrotaxane in DMSO-$d_6$ and measuring with a $^1$H-NMR measuring instrument (JNM-LA500 of JEOL Ltd.) in accordance with the following method.
X, Y and X/(Y−X) mean the following.
X: integrated value of protons derived from the hydroxyl groups of cyclodextrin at 4 to 6 ppm
Y: integrated value of protons derived from the methylene chains of cyclodextrin and PEG at 3 to 4 ppm
X/(Y−X): proton ratio of cyclodextrin to PEG
X/(Y−X) at the time when the maximum clathration amount was theoretically 1 was first calculated and compared with X/(Y−X) calculated from the analytical value of the actual compound to calculate the clathration amount.
(1-3) Introduction into Side Chain of Polyrotaxane;
500 mg of the above purified polyrotaxane was dissolved in 50 mL of a 1 mol/L NaOH aqueous solution, and 3.83 g (66 mmol) of propylene oxide was added and stirred at room temperature in an argon atmosphere for 12 hours.
Then, the above polyrotaxane solution was neutralized to a pH of 7 to 8 by using a 1 mol/L HCl aqueous solution, and the neutralized polyrotaxane solution was dialyzed with a dialysis tube and then freeze dried to obtain hydroxypropylated polyrotaxane.
It was confirmed by $^1$H-NMR and GPC identification that the obtained hydroxypropylated polyrotaxane was hydroxypropylated polyrotaxane having a desired structure.
The degree of modification of the OH groups of the cyclic molecule by the hydroxypropyl group was 0.5, and the average weight molecular weight Mw measured by GPC was 180,000.
5 g of the obtained hydroxypropylated polyrotaxane was dissolved in 22.5 g of ε-caprolactone at 80° C. to prepare a mixed solution. After this mixed solution was stirred at 110° C. for 1 hour while dry nitrogen was blown, 0.16 g of a 50 wt % xylene solution of 2-ethyltin hexanoate (II) was added and stirred at 130° C. for 6 hours. Thereafter, xylene was added to obtain a polycaprolactone-modified polyrotaxane xylene solution having a nonvolatile concentration of about 35 mass % into which side chains were introduced.
(1-4) Preparation of OH Group-Introduced Side Chain-Modified Polyrotaxane (A-1);
The polycaprolactone-modified polyrotaxane xylene solution prepared above was added dropwise to hexane to collect and dry the reaction product so as to obtain side chain-modified polyrotaxane having an OH group as a polymerizable functional group (A-1).
The physical properties of this polyrotaxane (A-1) were as follows.
Degree of modification of side chain: 0.5
Molecular weight of side chain: about 500 on average
Weight average molecular weight Mw of polyrotaxane (GPC): 700,000
(1-5) Preparation of OH Group-Introduced Side Chain-Modified Polyrotaxane (A-2);
Side chain-modified polyrotaxane having an OH group as a polymerizable functional group (A-2) was obtained completely in the same manner as (A-1) except that PEG having a molecular weight of 20,000 was used.

The physical properties of this polyrotaxane (A-2) were as follows.
Clathration amount of α-CD: 0.25
Degree of modification of side chain: 0.5
Molecular weight of side chain: about 500 on average
Weight average molecular weight Mw of polyrotaxane (GPC): 400,000

(1-6) Preparation of OH Group-Introduced Side Chain-Modified Polyrotaxane (A-3);

Side chain-modified polyrotaxane having an OH group as a polymerizable functional group (A-3) was obtained completely in the same manner as (A-1) except that PEG having a molecular weight of 70,000 was used.

The physical properties of this polyrotaxane (A-3) were as follows.
Clathration amount of α-CD: 0.25
Degree of modification of side chain: 0.5
Molecular weight of side chain: about 500 on average
Weight average molecular weight Mw of polyrotaxane (GPC): 1,400,000

(1-7) Preparation of OH Group-Introduced Side Chain-Modified Polyrotaxane (A-4);

OH group-introduced side chain-modified polyrotaxane (A-4) was obtained completely in the same manner as (A-1) except that the amount of ε-caprolactone used to form a side chain was changed to 12.5 g.

The physical properties of this polyrotaxane (A-4) were as follows.
Clathration amount of α-CD: 0.25
Degree of modification of side chain: 0.5
Molecular weight of side chain: about 500 on average
Weight average molecular weight Mw of polyrotaxane (GPC): 480,000

(2-1) Preparation of Acrylic Group-Introduced Side Chain-Modified Polyrotaxane (A-5)

The xylene solution of polycaprolactone-modified polyrotaxane prepared in (1-3) was used.

After 0.01 g of dibutyl hydroxytoluene (polymerization inhibitor) was added to 30 g of the above xylene solution of polycaprolactone-modified polyrotaxane, 3.8 g of 2-acryloyloxyethyl isocyanate was added dropwise.

The resulting solution was stirred at 40° C. for 16 hours to obtain a xylene solution of polyrotaxane in which an acrylic group was introduced into the end of polycaprolactone.

This polyrotaxane xylene solution was added dropwise to hexane, collected and dried to obtain polyrotaxane having an acrylic group introduced into the side chain as a polymerizable functional group (A-5).

The physical properties of this acrylic group-introduced side chain-modified polyrotaxane (A-5) were as follows.
Clathration amount of α-CD: 0.25
Degree of modification of side chain: 0.5
Molecular weight of side chain: about 600 on average
Weight average molecular weight Mw of polyrotaxane (GPC): 540,000

(2-2) Preparation of Acrylic Group-Introduced Side Chain-Modified Polyrotaxane (A-6);

Acrylic group-introduced side chain-modified polyrotaxane (A-6) was prepared completely in the same manner as (A-5) except that PEG having a molecular weight of 20,000 was used.

The physical properties of this acrylic group-introduced side chain-modified polyrotaxane (A-5) were as follows.
Clathration amount of α-CD: 0.25
Degree of modification of side chain: 0.5
Molecular weight of side chain: about 600 on average
Weight average molecular weight Mw of polyrotaxane (GPC): 540,000

(2-3) Preparation of Methacrylic Group-Introduced Side Chain-Modified Polyrotaxane (A-7);

Methacrylic group-introduced side chain-modified polyrotaxane (A-7) was prepared in the same manner as (A-5) except that 4.2 g of 2-methacryloyloxyethyl isocyanate was used in place of 3.8 g of 2-acryloyloxyethyl isocyanate used in the preparation of (A-5).

The physical properties of this methacrylic group-introduced side chain-modified polyrotaxane (A-7) were as follows.
Clathration amount of α-CD: 0.25
Degree of modification of side chain: 0.5
Molecular weight of side chain: about 600 on average
Weight average molecular weight Mw of polyrotaxane (GPC): 960,000

(2-4) Preparation of Methacrylic Group-Introduced Side Chain-Modified Polyrotaxane (A-8);

Methacrylic group-introduced side chain-modified polyrotaxane (A-8) was prepared in the same manner as (A-7) except that PEG having a molecular weight of 20,000 was used.

The physical properties of this methacrylic group-introduced side chain-modified polyrotaxane (A-8) were as follows.
Clathration amount of α-CD: 0.25
Degree of modification of side chain: 0.5
Molecular weight of side chain: about 600 on average
Weight average molecular weight Mw of polyrotaxane (GPC): 550,000

(1-8) Preparation of OH Group-Introduced Side Chain-Modified Polyrotaxane (A-9);

1.00 g of the hydroxypropylated polyrotaxane synthesized in (1-3) was put into a three-necked flask, and a mixture of 102 g of ε-caprolactone and 11 g of α-acetyl-γ-butyrolactone was added to the flask while nitrogen was let flow slowly.

The obtained mixture was stirred with a mechanical stirrer at 80° C. for 30 minutes to be homogenized, the reaction temperature was raised up to 100° C., and 0.16 g of 2-ethyltin hexanoate (50 wt % solution) diluted with toluene in advance was added to carry out a reaction for 4 hours.

After the end of the reaction, the sample was dissolved in 50 ml of toluene and added dropwise to 450 ml of hexane under agitation to precipitate a solid which was then collected and dried to obtain OH group-introduced side chain-modified polyrotaxane (A-9).

The physical properties of this polyrotaxane (A-9) were as follows.
Degree of modification of side chain: 0.5
Molecular weight of side chain: about 5,200 on average
Weight average molecular weight Mw of polyrotaxane (GPC): 4,000,000

(1-9) Preparation of OH Group-Introduced Side Chain-Modified Polyrotaxane (A-10);

OH group-introduced side chain-modified polyrotaxane (A-10) was prepared in the same manner as (A-1) except that PEG having a molecular weight of 20,000 was used and the amount of ε-caprolactone in (1-3) was changed to 33.5 g.

The physical properties of this polyrotaxane (A-10) were as follows.
Clathration amount of α-CD: 0.25
Degree of modification of side chain: 0.5
Molecular weight of side chain: about 700 on average Weight average molecular weight Mw of polyrotaxane (GPC): 600,000

(1-10) Preparation of OH Group-Introduced Side Chain-Modified Polyrotaxane (A-11);

OH group-introduced side chain-modified polyrotaxane (A-11) was prepared in the same manner as (A-1) except that PEG having a molecular weight of 20,000 was used and the amount of ε-caprolactone in (1-3) was changed to 125 g.

The physical properties of this polyrotaxane (A-11) were as follows.
Clathration amount of α-CD: 0.25
Degree of modification of side chain: 0.5
Molecular weight of side chain: about 2,500 on average
Weight average molecular weight Mw of polyrotaxane (GPC): 1,900,000

(1-11) Preparation of OH Group-Introduced Side Chain-Modified Polyrotaxane (A-12);

OH group-introduced side chain-modified polyrotaxane (A-12) was prepared in the same manner as (A-1) except that PEG having a molecular weight of 90,000 was used and the amount of ε-caprolactone in (1-3) was changed to 12.5 g.

The physical properties of this polyrotaxane (A-12) were as follows.
Clathration amount of α-CD: 0.25
Degree of modification of side chain: 0.5
Molecular weight of side chain: about 300 on average
Weight average molecular weight Mw of polyrotaxane (GPC): 1,100,000

(1-12) Preparation of OH Group-Introduced Side Chain-Modified Polyrotaxane (A-13);

Polyrotaxane having an OH group as a reactive group (A-13) was prepared in the same manner as (A-1) except that 25.3 g of α-acetyl-γ-butyrolactone was used in place of ε-caprolactone.

The physical properties of this polyrotaxane (A-13) were as follows.
Clathration amount of α-CD: 0.25
Degree of modification of side chain: 0.5
Molecular weight of side chain: about 500 on average
Weight average molecular weight Mw of polyrotaxane (GPC): 750,000

(1-13) Preparation of OH Group-Introduced Side Chain-Modified Polyrotaxane (A-14);

1.00 g of the hydroxypropylated polyrotaxane synthesized in (1-3) was put into a three-necked flask, and 4.1 g of 1,3-dioxan-2-one, 20 ml of benzonitrile and 0.5 ml of methyl iodide were injected while nitrogen was let flow slowly and stirred with a mechanical stirrer at 120° C. for 18 hours.

After the end of the reaction, the sample was dissolved in 50 ml of toluene and added dropwise to 450 ml of hexane under agitation to precipitate a solid which was then collected and dried to obtain OH group-introduced side chain-modified polyrotaxane (A-14).

The physical properties of this polyrotaxane (A-14) were as follows.
Degree of modification of side chain: 0.5
Molecular weight of side chain: about 500 on average
Weight average molecular weight Mw of polyrotaxane (GPC): 600,000

(2-5) Preparation of 2-Bromoisobutyrylated Polyrotaxane;

5.0 g of the hydroxypropylated polyrotaxane synthesized in (1-3) was put into a three-necked flask to be pre-dried and substituted by nitrogen. 0.6 g of dimethylamino pyridine was added to this, and 50 ml of dimethyl acetamide (DMAc) substituted by nitrogen was added to dissolve the obtained mixture.

7.6 ml (1.1 equivalent based on the total of all OH groups of polyrotaxane) of triethylamine and 6.2 ml (1.0 equivalent) of 2-bromoisobutyryl bromide were added dropwise to the resulting solution in an ice bath to carry out a reaction at 0° C. to room temperature for 5 hours. The reaction solution was added dropwise to hexane, and the obtained reprecipitate was collected and dried under reduced pressure to obtain 2-bromoisobutyrylated polyrotaxane.

The physical properties of this 2-bromoisobutyrylated polyrotaxane were as follows.
Degree of modification of side chain: 0.5
Weight average molecular weight Mw of polyrotaxane (GPC): 210,000

(2-6) Preparation of Methacrylic Group-Introduced Side Chain-Modified Polyrotaxane (A-15);

After 2.0 g of the 2-bromoisobutyrylated polyrotaxane prepared above was put into a three-necked flask to be substituted by nitrogen, 16.6 g (40 equivalents based on the number of moles of the 2-bromoisobutyryl group) of methyl methacrylate was added to dissolve the above polyrotaxane. 5 ml of nitrogen-substituted DMAc was added to this and stirred.

Subsequently, 0.06 g of copper bromide and 0.13 g of 2,2'-dipyridyl were added as catalysts and stirred at room temperature for 5 hours. After 5 hours, the reaction system was made open to confirm that the reaction solution turned from dark brown to green, and then the reaction solution was suction filtered by using silica as a filtration aid. This filtrate was added dropwise to methanol, and the obtained reprecipitate was collected and dried under reduced pressure to obtain methacrylic group-introduced side chain-modified polyrotaxane (A-15).

The physical properties of this polyrotaxane (A-15) were as follows.
Degree of modification of side chain: 0.5
Molecular weight of side chain: about 600 on average
Weight average molecular weight Mw of polyrotaxane (GPC): 720,000

(1-14) Preparation of Pseudo-Polyrotaxane Containing Polydimethylcyclohexane as Axial Molecule;

6 g of γ-cyclodextrin (γ-CD) was put into a 200 ml eggplant-shaped flask, and 20 mL of ion exchange water was added to dissolve γ-CD.

Separately, 420 mg of bis(3-aminopropyl)-terminated poly(dimethylsiloxane) (PDM, average molecular weight of 26,000) was weighed and put into a 200 ml flask. The above γ-CD aqueous solution was added to this flask at a stretch while ultrasonic waves were applied and stirred for 30 minutes under the application of ultrasonic waves.

Thereafter, the solution was left to stand at room temperature (25° C.) for 3 days to obtain a white suspension. After the obtained suspension was stirred well again and frozen uniformly with liquid nitrogen, it was freeze dried for 2 days to obtain pseudo-polyrotaxane containing polydimethylcyclohexane as an axial molecule.

(1-15) Preparation of Polyrotaxane Containing Polydimethylcyclohexane as Axial Molecule;

250 mg of 4,4',4'-trimethoxytrityl chloride (TMTC) was put into a 50 ml eggplant-shaped flask in an argon atmosphere, and 2 mL of dehydrated 1,4-dioxane was further added to dissolve TMTC. Separately, 250 mg of the pseudo-polyrotaxane obtained in (1-14) was put into a glass vessel in an argon atmosphere, and the above TMTC solution was added to this vessel at a stretch. Right after this, 0.07 mL of triethylamine (TEA) was added dropwise to the resulting solution and left to stand at room temperature (25° C.) for 24 hours without stirring. The pseudo-polyrotaxane containing polydimethylcyclohexane as an axial molecule did not dissolve in 1,4-dioxane with the result that a reaction was carried out in heterogeneous system. After the reaction, the heterogeneous reaction solution was stirred well again to obtain a suspension.

This suspension was added dropwise to 50 mL of water which was turned at a high speed to obtain a white precipitate. After a liquid material containing this precipitate was changed into a suspension by ultrasonic waves, the suspension was filtered, and the obtained solid was washed in a large amount of water to obtain a powder. The obtained powder was dried, and 30 mL of acetone was added to suspend the powder by ultrasonic waves so as to obtain a suspension. This suspension was filtered to collect a solid which was then washed with a large amount of acetone. Washing in a large amount of water, drying, acetone suspension, filtration and acetone washing were repeated again to obtain polyrotaxane containing polydimethycyclohexane as an axial molecule.

When the obtained polyrotaxane was dissolved in pyridine-d5 to be measured by $^1$H-NMR, it was found from comparison between the integrated value of a peak derived from polydimethylsiloxane at around 0.5 ppm and the integrated value of a peak derived from γ-CD at 4 to 5 ppm that the clathration amount of γ-CD constituting the polyrotaxane was 0.25.

(1-16) Preparation of OH Group-Introduced Side Chain-Modified Polyrotaxane (A-16);

500 mg of the polyrotaxane purified in (1-15) was dissolved in 50 mL of a 1 mol/L NaOH aqueous solution, and 3.83 g (66 mmol) of propylene oxide was added to the resulting solution and stirred at room temperature in an argon atmosphere for 12 hours.

The resulting solution was neutralized to a pH of 7 to 8 by using a 1 mol/L HCl aqueous solution, and the neutralized solution was dialyzed with a dialysis tube and freeze dried to obtain hydroxypropylated polyrotaxane.

It was confirmed by 1H-NMR and GPC identification that the obtained hydroxypropylated polyrotaxane was hydroxypropylated polyrotaxane having a desired structure. The degree of modification of the OH groups of the cyclic molecule by the hydroxypropyl group was 0.5, and the average weight molecular weight Mw measured by GPC was 170,000. 5 g of the hydroxypropylated polyrotaxane obtained above was dissolved in 22.5 g of ε-caprolactone at 80° C. to obtain a mixed solution. After this mixed solution was stirred at 110° C. for 1 hour while dry nitrogen was blown, 0.16 g of a 50 wt % xylene solution of 2-ethyltin hexanoate (II) was added and stirred at 130° C. for 6 hours. Thereafter, xylene was added to obtain a xylene solution. Then, this solution was added dropwise to hexane, and the obtained precipitate was collected and dried to obtain OH group-introduced side chain-modified polyrotaxane (A-16).

The physical properties of this polyrotaxane (A-16) were as follows.
Clathration amount of α-CD: 0.25
Degree of modification of side chain: 0.5
Molecular weight of side chain: about 600 on average
Weight average molecular weight Mw of polyrotaxane (GPC): 650,000

(1-17) Preparation of Both-Terminal Nitrophenyl Esterified Polybutadiene;

5.0 g of both-terminal carboxylated polybutadiene having an average molecular weight of 10,000 was put into a 100 ml eggplant-shaped flask, and a solution prepared by dissolving 1.91 g of p-nitrophenol and 2.83 g of dicyclohexyl carbodiimide (DCC) in 25 mL of dehydrated dichloromethane was added to this and stirred at room temperature in an argon atmosphere for 40 hours. Thereafter, the obtained precipitate was removed by filtration, and the filtrate was added dropwise to 300 mL of methanol to precipitate a product.

The obtained precipitate was dissolved in 30 mL of dichloromethane again and reprecipitated with 300 mL of methanol to further carry out purification. The precipitate obtained as described above was vacuum dried to obtain 5.0 g of both-terminal nitrophenyl esterified polybutadiene as a colorless transparent viscous liquid. This identification was carried out by the IR spectrum and 1H-NMR.

A 1,770 cm$^{-1}$ signal derived from the carbonyl stretching vibration of p-nitrophenyl ester was observed in the IR spectrum, and 8.29 ppm and 7.28 ppm signals derived from a phenyl group and a 2.84 ppm signal derived from α-methylene of carbonyl were observed in the 1H-NMR spectrum.

Since no signal derived from unreacted carboxylic acid was observed in the IR spectrum and the 1H-NMR spectrum, it was found that the both ends of the polymer were almost quantitatively nitrophenyl esterified.

(1-18) Preparation of Polyrotaxane Containing Polybutadiene as Axial Molecule;

40 g of γ-CD was put into a 500 mL eggplant-shaped flask, and 230 mL of ion exchange water was added to dissolve it. Separately, 1.93 g of the both-terminal nitrophenyl esterified polybutadiene obtained in (1-17) above was weighed and dissolved in 23 mL of THF in a 100 mL flask. This solution was added to the above γ-CD aqueous solution while ultrasonic waves were applied and further stirred for another 1 hour under the application of ultrasonic waves, and then a stirrer was put into the flask to stir the resulting solution at room temperature for 0.4 days so as to obtain a white suspension. The obtained suspension was frozen with liquid nitrogen and freeze dried for 2 days to obtain pseudo-polyrotaxane containing polybutadiene as an axial molecule.

1 mL of ethyl diisopropylamine (EDIPA) was put into a 300 ml eggplant-shaped flask in an argon atmosphere, and 200 mL of dehydrated acetonitrile was further added to dissolve EDIPA.

This resulting solution was put into the eggplant-shaped flask containing the pseudo-polyrotaxane containing polybutadiene prepared above at a stretch and stirred at room temperature (25° C.) for 4 days. The pseudo-polyrotaxane containing polybutadiene as an axial molecule did not dissolve in the above acetonitrile solvent, thereby carrying out a reaction in heterogeneous system.

After the reaction, the heterogeneous reaction solution was centrifuged to remove the supernatant, and 200 mL of DMSO was added to obtain an almost transparent solution. This solution was added dropwise to 1,500 mL of dichloromethane which was turned at a high speed to obtain a light yellow suspension. The suspension containing a precipitate was centrifuged to precipitate a solid and throw the supernatant away.

The obtained precipitate was added to 1,000 mL of dichloromethane again and stirred to obtain a suspension which was then centrifuged to obtain a precipitate. The precipitate was dried under reduced pressure with a vacuum pump. A solid obtained by drying the precipitate was dissolved in 150 mL of DMSO and added dropwise to 1,500 mL of purified water which was turned at a high speed to obtain a light yellow suspension.

The suspension containing a precipitate was centrifuged to precipitate a solid and throw the supernatant away. The obtained precipitate was added to 1,000 ml of purified water again and stirred to obtain a suspension which was then centrifuged again to obtain a precipitate. The obtained precipitate (containing water) was frozen with liquid nitrogen and freeze dried for 2 days to obtain polyrotaxane containing polybutadiene as a linear molecule.

When the polyrotaxane was measured by 1H-NMR, it was found from comparison between the integrated values of a peak derived from an alkene proton at around 5.0 to 5.6 ppm and a peak derived from γ-CD at 4 to 5 ppm that the clathration amount of γ-CD constituting the polyrotaxane containing polybutadiene as a linear molecule was 0.2.

(1-19) Preparation of OH Group-Introduced Side Chain-Modified Polyrotaxane (A-17);

500 mg of the polyrotaxane obtained in (1-18) above was dissolved in 0.50 mL of a 1 mol/L NaOH aqueous solution, and 3.83 g (66 mmol) of propylene oxide was added to this solution and stirred at room temperature in an argon atmosphere for 12 hours.

After the obtained solution was neutralized to a pH of 7 to 8 by using a 1 mol/L HCl aqueous solution and the neutralized solution was dialyzed with a dialysis tube, it was freeze dried to obtain hydroxypropylated polyrotaxane. It was confirmed by 1H-NMR and GPC identification that the obtained hydroxypropylated polyrotaxane was hydroxypropylated polyrotaxane having a desired structure. The degree of modification of the OH groups of the cyclic molecule by the hydroxypropyl group was 0.5, and the average weight molecular weight Mw measured by GPC was 50,000.

5 g of the hydroxypropylated polyrotaxane obtained above was dissolved in 22.5 g of s-caprolactone at 80° C. to obtain a mixed solution. This mixed solution was stirred at 110° C. for 1 hour while dry nitrogen was blown, and 0.16 g of a 50 wt % xylene solution of 2-ethyltin hexanoate (II) was added and stirred at 130° C. for 6 hours. Thereafter, xylene was added to prepare a xylene solution. Then, the xylene solution was added dropwise to hexane, and the obtained precipitate was collected and dried to obtain polyrotaxane having an OH group as a reactive group (A-17).

The physical properties of this polyrotaxane (A-17) were as follows.
Clathration amount of γ-CD: 0.2
Degree of modification of side chain: 0.5
Molecular weight of side chain: about 600 on average
Weight average molecular weight Mw of polyrotaxane (GPC): 150,000

(1-20) Preparation of OH Group-Introduced Side Chain-Modified Polyrotaxane (A-18);

Polyrotaxane having an OH group as a reactive group (A-18) was prepared in the same manner as (A-1) except that 17.0 g of γ-butyrolactone was used in place of ε-caprolactone.

The physical properties of this polyrotaxane (A-18) were as follows.
Clathration amount of α-CD: 0.25
Degree of modification of side chain: 0.5
Molecular weight of side chain: about 500 on average
Weight average molecular weight Mw of polyrotaxane (GPC): 600,000

The clathration amount of α-CD was 0.25, the degree of modification was 0.5, the molecular weight of the side chain was about 500 on average, and as a result of GPC, the average weight a molecular weight Mw of the obtained polyrotaxane (A-18) was 600,000.

(1-21) Preparation of OH Group-Introduced Side Chain-Modified Polyrotaxane (A-19);

1.00 g of the hydroxypropylated polyrotaxane synthesized in (1-3) was put into a three-necked flask, and 4.1 g of 5-methyl-1,3-dioxan-2-one, 20 ml of benzonitrile and 0.5 ml of methyl iodide were introduced into the flask while nitrogen was let flow slowly and stirred at 120° C. with a mechanical stirrer for 18 hours. After the end of a reaction, 50 ml of the sample was dissolved in toluene and added dropwise to 450 ml of hexane under agitation to precipitate, collect and dry the reaction product, thereby obtaining OH group-introduced side chain-modified polyrotaxane (A-19).

The physical properties of this polyrotaxane (A-19) were as follows.
Clathration amount of α-CD: 0.25
Degree of modification of side chain: 0.5
Molecular weight of side chain: about 500 on average
Weight average molecular weight Mw of polyrotaxane (GPC): 600,000

(1-22) Preparation of OH Group-Introduced Side Chain-Modified Polyrotaxane (A-20);

OH group-introduced side chain-modified polyrotaxane (A-20) was obtained in the same manner as (A-14) except that 1.00 g of the hydroxypropylated polyrotaxane synthesized in (1-3) was put into a three-necked flask and 4.6 g of 5-methylene-1,3-dioxan-2-one was introduced into the flask while nitrogen was let flow slowly. 5-methylene-1,3-dioxan-2-one was synthesized by the method described in J. Polymer, Sci., Part A Polym. Chem., 31 581 (1993).

The physical properties of this polyrotaxane (A-20) were as follows.
Clathration amount of α-CD: 0.25
Degree of modification of side chain: 0.5
Molecular weight of side chain: about 500 on average
Weight average molecular weight Mw of polyrotaxane (GPC): 650,000

In the following examples and comparative examples, components mixed with the above polyrotaxanes and the evaluation method of photochromic properties are described below.

Photochromic Compound (B);

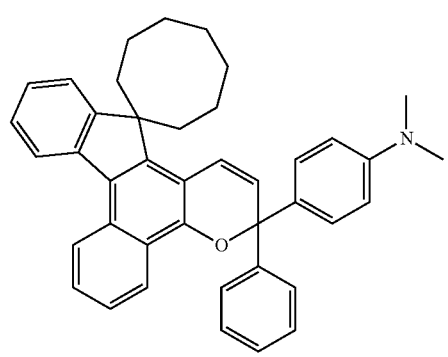

PC1

Polymerizable Monomer (C);
Polyol (C3-1)
PL1: Duranol of Asahi Kasei Chemicals Corporation (polycarbonate diol, number average molecular weight of 500)
TMP: trimethylolpropane
Polyol3610: polyester polyol manufactured by Perstorp (polyester polyol having an average of three OH groups in the molecule, molecular weight of 280)

Capa4101: polycaprolactone polyol manufactured by Perstorp (polycaprolactone polyol having an average of four OH groups in the molecular, molecular weight of 1,000)
Monofunctional Polymerizable Monomer (C4-3)
  PELE: polyoxyethylene lauryl ether (n≈23)
  PGOE1: polyethylene glycol monooleyl ether (n≈20)
  PGOE2: polyethylene glycol monooleyl ether (n≈7)
Polythiol (C3-2)
  TMMP: trimethylolpropane tris(3-mercaptopropionate)
  PEMP: pentaerythritol tetrakis(3-mercaptopropionate)
  DPMP: dipentaerythritol hexakis(3-mercaptopropionate)
  EGMP-4: tetraethylene glycol bis(3-mercaptopropionate)
  SH-1: 1,2-bis[(2-mercaptoethyl)thio]-3-mercaptopropane
  SH-2: 2,2-bis(mercaptomethyl)-1,4-butanedithiol
  SH-3: 1,4-bis(mercaptopropylthiomethyl)benzene
Polyisocyanate (C3-4)
  XDI: m-xylene diisocyanate
  IPDI: isophorone diisocyanate
  NBDI: norbornane diisocyanate
  NCO-1: 1,2-bis(2-isocyanatoethylthio)ethane
(Meth)Acrylic Polymerizable Monomer (C1-1)
  TMPT: trimethylolpropane trimethacrylate
  D-TMPT: ditrimethylolpropane tetramethacrylate
  3PG: tripropylene glycol dimethacrylate
  BPE100: 2,2-bis[4-(methacryloyloxyethoxy)phenyl]propane (average chain length of ethylene glycol chain of 2.6, average molecular weight of 478)
  A400: polyethylene glycol diacrylate (average chain length of ethylene glycol chain of 9, average molecular weight of 508)
  BPE500: 2,2-bis[4-(methacryloyloxypolyethoxy)phenyl]propane (average chain length of ethylene glycol chain of 10, average molecular weight of 804)
  A-BPE: 2,2-bis(4-acryloyloxypolyethoxyphenyl)propane (average number of recurring ethyleneoxy groups of 10, average molecular weight of 776)
  M90G: methoxy polyethylene glycol methacrylate (M90G of Shin-Nakamura Chemical Co., Ltd.)
  4G: tetraethylene glycol dimethacrylate
  9G: polyethylene glycol dimethacrylate (average chain length of ethylene glycol chain of 9, average molecular weight of 536)
  14G: polyethylene glycol dimethacrylate (average chain length of ethylene glycol chain of 14, average molecular weight of 736)
  EB4858: bifunctional urethane methacrylate manufactured by Daicel-UCB Co., Ltd. (acrylic equivalent of 227)
  PMS1: silsesquioxane monomer
  M-1: polycarbonate diol diacrylate
(Synthesis of PMS1)
  248 ml of ethanol and 54 g (3.0 mol) of water were added to 248 g (1.0 mol) of 3-trimethoxysilylpropyl methacrylate, and 0.20 (0.005 mol) of sodium hydroxide was added as a catalyst to carry out a reaction at 30° C. for 3 hours.
  After the disappearance of the raw materials was confirmed, the reaction product was neutralized with diluted hydrochloric acid, and 174 ml of toluene, 174 ml of heptane and 174 g of water were added to remove a water layer.
  Thereafter, an organic layer was washed in water until the water layer became neutral, and the solvent was concentrated to obtain a silsesquioxane monomer (PMS1).
  It was confirmed by $^1$H-NMR that the raw materials were completely consumed. It was confirmed by $^{29}$Si-NMR that the silsesquioxane monomer was a mixture having cage-like, ladder-like and random structures.

When the molecular weight of the silsesquioxane monomer (PMS1) was measured by gel permeation chromatography (GPC), the weight average molecular weight was 4,800.
(Process for Producing M-1 Monomer)
  108 g (2.5 mol) of acrylic acid, 300 g of benzene, 11 g (0.06 mol) of p-toluene sulfonic acid and 0.3 g (700 ppm based on polycarbonate diol) of p-methoxyphenol were added to 300 g (0.6 mol) of a polycarbonate diol (number average molecular weight of 500) obtained by phosgenating hexamethylene glycol (50 mol %) and pentamethylene glycol (50 wt %) to carry out a reaction under reflux.
  Water produced by the reaction was caused to co-boil together with the solvent, only water was removed to the outside of the system by a separator, and the solvent was returned into a reaction vessel.
  The conversion of the reaction was checked with the amount of water removed from the reaction system, it was confirmed that 21.6 g of water was removed from the reaction system, and the reaction was terminated.
  Thereafter, the reaction product was dissolved in 600 g of benzene, neutralized with 5% sodium hydrocarbonate and washed with 300 g of a 20% saline solution 5 times to obtain 210 g of a transparent liquid.
Polyamine (C3-3)
  IPDA: isophorone diamine
Vinyl-Based Polymerizable Monomer (C1-2)
  αMS: α-methylstyrene
  MSD: α-methylstyrene dimer
Allyl-Based Polymerizable Monomer (C1-3)
  MPEAE: methoxy polyethylene glycol allyl ether (average molecular weight of 550)
Composite Polymerizable Monomer (C4-4)
  GMA: glycidyl methacrylate
  MOI: 2-isocyanatoethyl methacrylate
(D) Polymerization-Curing Accelerator
Polymerization Initiator (D1)
<Thermal Polymerization Initiator>
  Perbutyl ND: t-butylperoxy neodecanate (trade name: Perbutyl ND, manufactured by NOF Corporation)
  Perocta O: 1,1,3,3-tetramethylbutylperoxy-2-ethyl hexanate (trade name: Perocta O, manufactured by NOF Corporation)
<Photopolymerization Initiator>
  PI: phenylbis(2,4,6-trimethylbenzoyl)-phosphine oxide (trade name: Irgacure819, manufactured by BASF)
Urethane or Urea Reaction Catalyst (D3-1)
  DBTD: dibutyltin dilaurate
Other Compounding Components
<Release Agent>
  DBP: di-n-butyltin
<Solvent>
  THF: tetrahydrofuran
  $CH_2Cl_2$: dichloromethane
  EA: ethyl acetate
  DMF: dimethyl sulfoxide
  IPA: isopropyl alcohol
<Stabilizer>
  HALS: bis(1,2,2,6,6-pentamethyl-4-piperidyl)sebacate (molecular weight of 508)
  HP: ethylenebis(oxyethylene)bis[3-(5-tert-butyl-4-hydroxy-m-tolyl)propionate] (manufactured by Ciba Specialty Chemicals Co., Ltd., Irganox245)
<Leveling Agent>
  L1: Dow Corning Toray Co., Ltd. trade name; L7001

Example 1

10 parts by mass of the polyrotaxane (A-5) and 15 parts by mass of tetrahydrofuran (THF) were stirred and dissolved at 50° C. for 1 hour.

Then, 0.3 part by mass of PC1 (photochromic compound), 0.03 part by mass of PI (polymerization initiator) and 0.01 part by mass of L1 (leveling agent) were added to and mixed with the resulting solution under agitation at 40° C. for 30 minutes to obtain a photochromic composition. The amounts of these components are shown in Table 1.

About 2 g of the photochromic composition obtained above was applied to the surface of a glass sheet having a diameter of 80 mm and a thickness of 2 mm with a spin coater (1H-DX2, manufactured by MIKASA) by controlling the revolution speed and time to ensure that the film thickness of the finally obtained photochromic coating film became 40 µm.

The glass sheet coated with the photochromic composition was exposed to light from a metal halide lamp having an output of 200 mW/cm$^2$ in a nitrogen gas atmosphere for 90 seconds to cure the coating film. Thereafter, the film was further heated at 100° C. for 1 hour to manufacture a photochromic laminate having a photochromic coating layer.

The obtained photochromic laminate had photochromic properties such as a maximum absorption wavelength of 580 nm, a color optical density of 0.92 and a fading speed of 35 seconds. The evaluation of these photochromic properties was carried out as follows.

The obtained photochromic laminate (thickness of about 2 mm) was used as a sample and exposed to light from the L-2480 (300 W) SHL-100 xenon lamp of Hamamatsu Photonics K.K. through an aeromass filter (of Corning Incorporated) at 20±1° C. with a beam intensity on the surface of the polymer (photochromic coating layer) of 2.4 mW/cm$^2$ at 365 nm and 24 µW/cm$^2$ at 245 nm for 120 seconds to develop color so as to measure the photochromic properties of the photochromic laminate. The photochromic properties and Rockwell hardness were evaluated by the following methods and shown in Table 2.

Maximum Absorption Wavelength (λmax):

Maximum absorption wavelength after color development obtained by the spectrophotometer (instantaneous multi-channel photodetector MCPD1000) of Otsuka Electronics Co., Ltd. The maximum absorption wavelength is connected with color at the time of color development.

Color Optical Density {ε(120)−ε(0)}:

Difference between absorbance {ε(120)} after 120 seconds of exposure to light at the above maximum absorption wavelength and absorbance ε(0) before exposure.

It can be said that as this value becomes larger, photochromic properties become more excellent. Color which was developed outdoors was evaluated visually.

Fading Speed [t1/2 (sec.)]:

Time elapsed until the absorbance at the above maximum absorption wavelength of the sample drops to ½ of {ε(120)−ε(0)} when exposure is continued for 120 seconds and then stopped. It can be said that as this time becomes shorter, photochromic properties become more excellent.

Examples 2 to 8, Comparative Example 1

Photochromic laminates were manufactured and evaluated in the same manner as in Example 1 except that the photochromic compositions shown in Table 1 were used. The results are shown in Table 2.

Example 9

The photochromic composition shown in Table 1 was poured over a glass petri dish having a diameter of about 80 mm to ensure that the thickness of the finally obtained photochromic film became 40 µm. Then, tetrahydrofuran was evaporated from the glass petri dish under vacuum to ensure that air bubbles were not produced in the photochromic film, and finally the film was thermally cured at 100° C. for 3 hours to form a photochromic film. The obtained photochromic film had photochromic properties such as a maximum absorption wavelength of 580 nm, a color optical density of 0.92 and a fading speed of 34 seconds. These evaluations were made in the same manner as in Example 1. The results are shown in Table 2.

Example 10

A photochromic film was formed and evaluated in the same manner as in Example 9 except that the photochromic composition shown in Table 1 was used. The results are shown in Table 2.

TABLE 1

| | | | | Other compounding agents (additives) | | |
|---|---|---|---|---|---|---|
| No. | *1 | *2 | *3 | Solvent (parts by mass) | Polymerization initiator (parts by mass) | Leveling agent (parts by mass) |
| Ex. 1 | A-5(10) | PC1(0.3) | — | THF(15) | P1(0.03) | L1(0.01) |
| Ex. 2 | A-6(10) | PC1(0.3) | — | THF(15) | P1(0.03) | L1(0.01) |
| Ex. 3 | A-7(10) | PC1(0.3) | — | THF(15) | P1(0.03) | L1(0.01) |
| Ex. 4 | A-8(10) | PC1(0.3) | — | THF(15) | P1(0.03) | L1(0.01) |
| Ex. 5 | A-5(10) | PC1(0.3) | — | CH2Cl2(15) | P1(0.03) | L1(0.01) |
| Ex. 6 | A-6(10) | PC1(0.3) | — | CH2Cl2(15) | P1(0.03) | L1(0.01) |
| Ex. 7 | A-5(10) | PC1(0.3) | — | EA(15) | P1(0.03) | L1(0.01) |
| Ex. 8 | A-6(10) | PC1(0.3) | — | EA(15) | P1(0.03) | L1(0.01) |
| Ex. 9 | A-5(10) | PC1(0.3) | — | THF(15) | Perbutyl ND (0.15) | — |
| Ex. 10 | A-6(10) | PC1(0.3) | — | THF(15) | Perbutyl ND (0.15) | — |
| Comp. Ex. 1 | | PC1(0.3) | 4G(10) | — | P1(0.03) | L1(0.01) |

*1: Component A (parts by mass),
*2: Component B (parts by mass),
*3: Polymerizable monomer (parts by mass)

TABLE 2

| No. | Maximum absorption wavelength (λmax) | Color optical density | Fading speed (sec) |
|---|---|---|---|
| Ex. 1 | 580 | 0.92 | 35 |
| Ex. 2 | 580 | 0.91 | 36 |
| Ex. 3 | 580 | 0.91 | 38 |
| Ex. 4 | 580 | 0.90 | 39 |
| Ex. 5 | 580 | 0.92 | 36 |
| Ex. 6 | 580 | 0.91 | 37 |
| Ex. 7 | 580 | 0.92 | 35 |
| Ex. 8 | 580 | 0.91 | 36 |
| Ex. 9 | 580 | 0.92 | 34 |
| Ex. 10 | 580 | 0.91 | 35 |
| Comp. Ex. 1 | 580 | 0.81 | 125 |

Example 11

Components were mixed together according to the following formulation to prepare a homogeneous solution (photochromic composition). The amounts of the components are shown in Table 1.

Formulation;
Polyrotaxane (A): 1 part by mass of (A-1)
Polymerizable monomers (C): 43 parts by mass of XDI
56 parts by mass of PEMP
Photochromic compound (3): 0.04 part by mass of PC1
Other compounding agent (additive): 0.1 wt % of dibutyltin dilaurate (catalyst) (based on the total amount of the mixture)

A photochromic cured body was obtained by using the above photochromic composition by the kneading method. The polymerization method is shown below.

That is, after the above homogeneous solution was fully defoamed, it was injected into a molding mold composed of a casting mold including glass molds subjected to a release treatment and a gasket made of an ethylene-vinyl acetate copolymer.

Then, the solution was cured over 15 hours while the temperature was gradually raised from 30° C. to 95° C. After the end of polymerization, the photochromic cured body was removed from the glass molds of the casting mold. The obtained photochromic cured body had a maximum absorption wavelength of 595 nm, a color optical density of 0.25 and a fading speed of 100 sec. The moldability of the obtained photochromic cured body was satisfactory. Further, the obtained photochromic cured body had an L-scale Rockwell hardness (HL) of 110 and a good appearance with a cloudiness of 1.

The maximum absorption wavelength, color optical density and fading speed were evaluated in the same manner as in Example 1, and moldability, L-scale Rockwell hardness and cloudiness were evaluated as follows.

Moldability:
The optical distortion of the molded photochromic cured body was checked visually. Moldability was evaluated based on the following criteria.
1: no optical distortion
2: optical distortion is observed in part of less than half of a lens
3: optical distortion is observed in entire lens L-Scale Rockwell Hardness (HL):
After the above cured body was kept indoors at 25° C. for one day, the L-scale Rockwell hardness of the photochromic cured body was measured by using the Akashi Rockwell hardness meter (model: A-10).

Cloudiness:
The cloudiness of the molded photochromic cured body was evaluated visually under crossed nicols.
1: not or almost not clouded that it has no problem as a product
2: slightly clouded but it has no problem as a product
3: more clouded than 2 though it has no problem as a product
4: so much clouded that it cannot be used as a product

Examples 12 to 38, Comparative Examples 2 and 3

Photochromic cured bodies were manufactured and evaluated in the same manner as in Example 11 except that the photochromic compositions shown in Tables 3 and 4 were used. The results are shown in Table 5. The fading speeds of Comparative Examples 2 and 3 could not be measured as their optical color densities were too low.

TABLE 3

| No. | *1 | *2 | *3 | Component (C) (parts by mass) | Additive (parts by mass) | Initiator (parts by mass) |
|---|---|---|---|---|---|---|
| Ex. 11 | *4 | A-1(1) | PC1(0.04) | PEMP(56)/XDI(43) | — | DBTD(0.1) |
| Ex. 12 | *4 | A-1(3) | PC1(0.04) | TMMP(57)/XDI(40) | — | DBTD(0.1) |
| Ex. 13 | *4 | A-1(20) | PC1(0.04) | PEMP(35)/XDI(45) | — | DBTD(0.1) |
| Ex. 14 | *4 | A-2(6) | PC1(0.04) | PEMP(53)/XDI(41) | HALS(0.1) | DBTD(0.1) |
| Ex. 15 | *4 | A-3(6) | PC1(0.04) | PEMP(53)/XDI(41) | — | DBTD(0.1) |
| Ex. 16 | *4 | A-4(6) | PC1(0.04) | PEMP(53)/XDI(41) | — | DBTD(0.1) |
| Ex. 17 | *4 | A-9(3) | PC1(0.04) | SH-1(47)/XDI(50) | DBP(0.3) | DBTD(0.1) |
| Ex. 18 | *4 | A-10(6) | PC1(0.04) | DPMP(55)/XDI(39) | — | DBTD(0.1) |
| Ex. 19 | *4 | A-10(6) | PC1(0.04) | DPMP(37)/EGMP-4(20)/XDI(37) | DBP(0.3) | DBTD(0.1) |
| Ex. 20 | *4 | A-11(6) | PC1(0.04) | PEMP(53)/XDI(41) | — | DBTD(0.1) |
| Ex. 21 | *4 | A-12(6) | PC1(0.04) | PEMP(53)/XDI(41) | — | DBTD(0.1) |
| Ex. 22 | *4 | A-1(6) | PC1(0.04) | DPMP(53)/IPDI(41) | HALS(0.1) | DBTD(0.1) |
| Ex. 23 | *4 | A-14(6) | PC1(0.04) | PEMP(53)/XDI(41) | — | DBTD(0.1) |
| Ex. 24 | *4 | A-1(6) | PC1(0.04) | PEMP(48)/NCO-1(46) | — | DBTD(0.1) |
| Ex. 25 | *4 | A-10(9) | PC1(0.04) | PCD500(22)/TMP(18)/NBDI(51) | DBP(0.3) | — |
| Ex. 26 | *4 | A-16(6) | PC1(0.04) | PEMP(53)/XDI(41) | — | DBTD(0.1) |
| Ex. 27 | *4 | A-17(6) | PC1(0.04) | PEMP(53)/XDI(41) | — | DBTD(0.1) |

*1: Molding method,
*2: Component (A) (parts by mass),
*3: Component (B) (parts by mass),
*4: Kneading method

TABLE 4

| No. | *1 | *2 | *3 | Component (C) (parts by mass) | Additive (parts by mass) | Initiator (parts by mass) |
|---|---|---|---|---|---|---|
| Ex. 28 | *4 | A-10(4) | PC1(0.04) | SH-2(35)/XDI(61) | DBP(0.3) | DBTD(0.1) |
| Ex. 29 | *4 | A-2(6) | PC1(0.04) | SH-3(7)/PEME(47)/XDI(40) | — | DBTD(0.1) |
| Ex. 30 | *4 | A-13(6) | PC1(0.04) | PEMP(53)/XDI(41) | — | DBTD(0.1) |
| Ex. 31 | *4 | A-18(6) | PC1(0.04) | PEMP(53)/XDI(41) | — | DBTD(0.1) |
| Ex. 32 | *4 | A-19(3) | PC1(0.04) | PEMP(57)/XDI(40) | — | DBTD(0.1) |
| Ex. 33 | *4 | A-10(9) | PC1(0.04) | PL1(21)/TMP(17)/PELE(4)/NBDI(49) | DBP(0.3) | — |
| Ex. 34 | *4 | A-10(9) | PC1(0.04) | PL1(21)/TMP(17)/PGOE1(4)/NBDI(49) | — | — |
| Ex. 35 | *4 | A-10(11) | PC1(0.04) | Polyol3165(6)/PL1(17)/TMP(17)/NBDI(49) | — | — |
| Ex. 36 | *4 | A-10(9) | PC1(0.04) | Capa4101(12)/PL1(12)/TMP(17)/IPDI(50) | — | — |
| Ex. 37 | *4 | A-10(9) | PC1(0.04) | PL1(21)/TMP(17)/PGOE2(4)/NBDI(49) | DBP(0.3) | — |
| Ex. 38 | *4 | A-20(6) | PC1(0.04) | TMMP(55)/XDI(39) | — | DBTD(0.1) |
| Comp. Ex. 2 | *4 | | PC1(0.04) | PEMP(56)/XDI(44) | — | DBTD(0.1) |
| Comp. Ex. 3 | *4 | | PC1(0.04) | TMMP(59)/XDI(41) | HALS(0.1) | DBTD(0.1) |

*1: Molding method,
*2: Component (A) (parts by mass),
*3: Component (B) (parts by mass),
*4: Kneading method

TABLE 5

| No. | *1 | *2 | *3 | *4 | HL | *5 |
|---|---|---|---|---|---|---|
| Ex. 11 | 595 | 0.25 | 100 | 1 | 110 | 1 |
| Ex. 12 | 594 | 0.58 | 84 | 1 | 100 | 1 |
| Ex. 13 | 594 | 0.65 | 70 | 2 | 90 | 2 |
| Ex. 14 | 594 | 0.59 | 72 | 1 | 105 | 1 |
| Ex. 15 | 594 | 0.62 | 65 | 1 | 88 | 2 |
| Ex. 16 | 594 | 0.46 | 72 | 1 | 106 | 1 |
| Ex. 17 | 595 | 0.60 | 55 | 2 | 70 | 3 |
| Ex. 18 | 594 | 0.68 | 47 | 1 | 107 | 1 |
| Ex. 19 | 594 | 0.73 | 45 | 1 | 85 | 1 |
| Ex. 20 | 594 | 0.72 | 50 | 2 | 85 | 2 |
| Ex. 21 | 594 | 0.45 | 72 | 2 | 80 | 3 |
| Ex. 22 | 594 | 0.66 | 66 | 1 | 110 | 1 |
| Ex. 23 | 594 | 0.48 | 80 | 1 | 100 | 1 |
| Ex. 24 | 594 | 0.62 | 69 | 1 | 95 | 1 |
| Ex. 25 | 588 | 0.68 | 60 | 1 | 95 | 1 |
| Ex. 26 | 594 | 0.50 | 75 | 1 | 100 | 1 |
| Ex. 27 | 594 | 0.49 | 77 | 1 | 101 | 1 |
| Ex. 28 | 594 | 0.65 | 52 | 2 | 100 | 1 |
| Ex. 29 | 594 | 0.58 | 71 | 1 | 108 | 1 |
| Ex. 30 | 595 | 0.52 | 81 | 1 | 95 | 1 |
| Ex. 31 | 595 | 0.51 | 85 | 1 | 99 | 1 |
| Ex. 32 | 594 | 0.43 | 89 | 1 | 101 | 1 |
| Ex. 33 | 588 | 0.80 | 48 | 1 | 90 | 1 |
| Ex. 34 | 590 | 0.77 | 52 | 1 | 88 | 1 |
| Ex. 35 | 591 | 0.66 | 60 | 2 | 83 | 2 |
| Ex. 36 | 588 | 0.68 | 58 | 2 | 80 | 2 |
| Ex. 37 | 588 | 0.70 | 58 | 1 | 75 | 1 |
| Ex. 38 | 594 | 0.48 | 81 | 1 | 97 | 1 |
| Comp. Ex. 2 | 588 | 0.01 | *6 | 1 | 110 | 1 |
| Comp. Ex. 3 | 590 | 0.01 | *6 | 1 | 105 | 1 |

*1: Maximum absorption wavelength (λmax),
*2: Color optical density,
*3: Ading speed (sec),
*4: Moldability,
*5: Cloudiness,
*6: Not measurable Example 39

Components were fully mixed together according to the following formulation to prepare a photochromic composition.

Formulation;

Polyrotaxane (A): 6 parts by mass of (A-5)

Polymerizable monomers (C): 10 parts by mass of TMPT 47 parts by mass of 3PG 25 parts by mass of EB4858

9 parts by mass of M-1

1 part by mass of GMA 0.5 part by mass of αMS 1.5 parts by mass of MSD

Photochromic compound (B): 0.04 part by mass of PC1

Other compounding agents (additives):

0.1 part by mass of HALS (stabilizer)

1.5 parts by mass of Perbutyl ND (polymerization initiator)

0.1 part by mass of Perocta O (polymerization initiator)

The above formulation (composition of the photochromic composition) is shown in Table 6.

The obtained mixed solution (photochromic composition) was injected into a casting mold including glass sheets and a gasket made of an ethylene-vinyl acetate copolymer to polymerize substantially the total amount of the polymerizable monomers by cast polymerization.

The photochromic composition was polymerized in an air furnace and thermally cured by gradually raising the temperature from 30° C. to 90° C. over 18 hours. After the end of polymerization, the photochromic cured body was removed from the glass molds of the casting mold. The obtained photochromic cured body was evaluated for photochromic properties in the same manner as in Example 1 and for moldability in the same manner as in Example 11. The results are shown in Table 7.

Examples 40 to 43, Comparative Examples 4 and 5

Photochromic cured bodies were manufactured and evaluated in the same manner as in Example 39 except that the photochromic compositions shown in Table 6 were used. The results are shown in Table 7.

TABLE 6

| No. | *1 | *2 | *3 | Component (C) (parts by mass) | *4 | Initiator (parts by mass) |
|---|---|---|---|---|---|---|
| Ex. 39 | *5 | A-5(6) | PC1(0.04) | TMPT(10)/3PG(47)/EB4858(25)/M-1(9)/ GMA(1)/αMS(0.5)/MSD(1.5) | HALS (0.1) | Perbutyl ND(1.5) Perocta O(0.1) |
| Ex. 40 | *5 | A-6(6) | PC1(0.04) | TMPT(10)/3PG(46)/EB4858(25)/M-1(9)/ GMA(1)/αMS(0.5)/MSD(1.5)/MPEAE(1) | HALS (0.1) | Perbutyl ND(1.5) Perocta O(0.1) |
| Ex. 41 | *5 | A-5(3) | PC1(0.04) | TMPT(10)/3PG(47)/EB4858(25)/A400(6)/ M-1(6)/GMA(1)/αMS(0.5)/MSD(1.5) | HALS (0.1) | Perbutyl ND(1.5) Perocta O(0.1) |
| Ex. 42 | *5 | A-5(6) | PC1(0.04) | TMPT(10)/BPE100(33)/14G(33)/ BPE500(5)/M90G(12)/GMA(1) | HALS (0.1) | Perbutyl ND(1.5) Perocta O(0.1) |
| Ex. 43 | *5 | A-15(6) | PC1(0.04) | TMPT(10)/BPE100(33)/14G(33)/ BPE500(5)/M90G(12)/GMA(1) | HALS (0.1) | Perbutyl ND(1.5) Perocta O(0.1) |
| Comp. Ex. 4 | *5 | — | PC1(0.04) | TMPT(10)/3PG(47)/EB4858(31)/ M-1(9)/GMA(1)/αMS(0.5)/MSD(1.5) | HALS (0.1) | Perbutyl ND(1.5) Perocta O(0.1) |
| Comp. Ex. 5 | *5 | — | PC1(0.04) | TMPT(10)/BPE100(39)/14G(33)/ BPE500(5)/M90G(12)/GMA(1) | HALS (0.1) | Perbutyl ND(1.5) Perocta O(0.1) |

*1: Molding method,
*2: Component (A) (parts by mass),
*3: Component (B) (parts by mass),
*4: Additive (parts by mass),
*5: Kneading method

TABLE 7

| No. | *1 | *2 | *3 | *4 | HL | *5 |
|---|---|---|---|---|---|---|
| Ex. 39 | 588 | 0.94 | 51 | 1 | 73 | 1 |
| Ex. 40 | 588 | 0.92 | 50 | 1 | 71 | 1 |
| Ex. 41 | 590 | 0.84 | 53 | 1 | 75 | 1 |
| Ex. 42 | 591 | 0.90 | 59 | 1 | 76 | 1 |
| Ex. 43 | 588 | 0.85 | 65 | 1 | 65 | 1 |
| Comp. Ex. 4 | 588 | 0.65 | 92 | 1 | 76 | 1 |
| Comp. Ex. 5 | 590 | 0.62 | 84 | 1 | 79 | 1 |

*1: Maximum absorption wavelength (λmax),
*2: Color optical density,
*3: Ading speed (sec),
*4: Moldability,
*5: Cloudiness Example 44

Components were fully mixed together according to the following formulation to prepare a photochromic composition.
Formulation;
  Polyrotaxane (A): 1 part by mass of (A-5)
  Polymerizable monomers (C): 9 parts by mass of A-BPE
    8 parts by mass of M-1
    10 parts by mass of A400
    15 parts by mass of TMPT
    15 parts by mass of D-TMPT
    35 parts by mass of BPE500
    6 parts by mass of 14G
    1 part by mass of GMA
  Photochromic compound (B): 0.3 part by mass of PC1
  Other compounding agents (additives):
    0.2 part by mass of HALS (stabilizer)
    0.2 part by mass of HP (stabilizer)
    0.4 part by mass of PI (polymerization initiator)
    0.1 part by mass of L1 (leveling agent)
The above formulation (composition of the photochromic composition) is shown in Table 8.

Then, a photochromic laminate was obtained from the above photochromic composition by the lamination method. The polymerization method is shown below.

A thiourethane-based plastic lens having a center thickness of 2 mm and a refractive index of 1.60 was first prepared as an optical substrate. This thiourethane-based plastic lens was alkali etched with a 10% sodium hydroxide aqueous solution at 50° C. for 5 minutes and washed with distilled water completely in advance.

A moisture-curable primer (product name; TR-SC-P, manufactured by Tokuyama Corporation) was applied to the surface of the above plastic lens with a spin coater (1H-DX2, manufactured by MIKASA) at a revolution of 70 rpm for 15 seconds and then at 1,000 rpm for 10 seconds. Thereafter, about 2 g of the photochromic composition obtained above was spin coated at a revolution of 60 rpm for 40 seconds and then at 600 rpm for 10 to 20 seconds to ensure that the thickness of the photochromic coating layer became 40 μm.

The lens whose surface had been coated with the coating agent was exposed to light from a metal halide lamp having an output of 200 mW/cm$^2$ for 90 seconds in a nitrogen gas atmosphere to cure the coating film. Thereafter, it was further heated at 110° C. for 1 hour to manufacture a photochromic laminate having a photochromic layer.

The obtained photochromic laminate was evaluated for photochromic properties in the same manner as in Example 1 and for moldability in the same manner as in Example 11. The results are shown in Table 9.

Examples 45 and 46, Comparative Examples 6 and 7

Photochromic cured bodies were manufactured and evaluated in the same manner as in Example 44 except that the photochromic compositions shown in Table 8 were used. The results are shown in Table 9.

TABLE 8

| No. | *1 | *2 | *3 | Component (C) (parts by mass) | Additive (parts by mass) | *4 |
|---|---|---|---|---|---|---|
| Ex. 44 | *5 | A-5(1) | PC1(0.3) | A-BPE(9)/M-1(8)/A400(10)/TMPT(15)/D-TMPT(15)/BPE500(35)/14G(6)/GMA(1) | HALS(0.2)/HP(0.2)/L1(0.1) | PI(0.4) |
| Ex. 45 | *5 | A-5(6) | PC1(0.3) | A-BPE(4)/PMS1(10)/TMPT(30)/GMA(1)/BPE500(35)/14G(6)/M-1(8) | HALS(0.2)/HP(0.2)/L1(0.1) | PI(0.4) |
| Ex. 46 | *5 | A-6(6) | PC1(0.3) | BPE500(35)/PMS1(10)/14G(9)/GMA(5)/TMPT(30)/A400(5) | HALS(0.2)/HP(0.2)/L1(0.1) | PI(0.4) |
| Comp. Ex. 6 | *5 | — | PC1(0.3) | A-BPE(10)/M-1(8)/A400(10)/TMPT(15)/D-TMPT(15)/BPE500(35)/14G(6)/GMA(1) | HALS(0.2)/HP(0.2)/L1(0.1) | PI(0.4) |
| Comp. Ex. 7 | *5 | — | PC1(0.3) | A-BPE(5)/PMS1(10)/TMPT(30)/GMA(1)/BPE500(43)/14G(6)/M-1(5) | HALS(0.2)/HP(0.2)/L1(0.1) | PI(0.4) |

*1: Molding method,
*2: Component (A) (parts by mass),
*3: Component (B) (parts by mass),
*4: Initiator (parts by mass),
*5: Surface method

TABLE 9

| No. | *1 | *2 | *3 | *4 |
|---|---|---|---|---|
| Ex. 44 | 590 | 0.95 | 57 | 1 |
| Ex. 45 | 591 | 1.04 | 47 | 1 |
| Ex. 46 | 591 | 0.99 | 49 | 1 |
| Comp. Ex. 6 | 590 | 0.80 | 80 | 1 |
| Comp. Ex. 7 | 590 | 0.85 | 63 | 1 |

*1: Maximum absorption wavelength (λmax),
*2: Color optical density,
*3: Ading speed (sec),
*4: Moldability Example 47

Components were fed to a reactor according to the following formulation to be reacted with one another at 120° C. for 5 hours in a nitrogen atmosphere.
Formulation;
  Polyrotaxane (A): 2 parts by mass of (A-1)
  Polymerizable monomers (C): 36 parts by mass of PL1
    51 parts by mass of IPDI
  Other compounding agent (additive): 300 mass % of DMF (solvent) (based on the total amount of a mixture)
Thereafter, the reaction product was cooled to 25° C., 11 parts by mass of IPDA which is the component (C) as a chain transfer agent was added dropwise to the reaction product to carry out a reaction at 25° C. for 1 hour, and the solvent was distilled off under reduced pressure to obtain a polyurethane-urea resin (U1).

The obtained polyurethane-urea resin had a molecular weight of 150,000 in terms of polystyrene and 10,000 (theoretical value; 10,000) in terms of polyoxyethylene and a heat resistance of 140° C.

0.3 part by mass of PC1 as a photochromic compound (B) and 400 mass % (based on the total amount of a mixture) of isopropyl alcohol (organic solvent) and 0.5 part by mass of HALS (stabilizer) as other compounding agents (additives) were added to the obtained polyurethane-urea resin (U1) and dissolved by ultrasonic waves at 80° C. under agitation to obtain a photochromic composition. The composition of this photochromic composition is shown in Table 10.

A photochromic laminated sheet was manufactured from the obtained photochromic composition by the binder method.

That is, the above photochromic composition was applied to a fluorine resin sheet having a smooth surface and dried at 80° C. for 1 hour, and the obtained photochromic sheet having a thickness of 30 μm was sandwiched between two polycarbonate sheets having a thickness of 400 μm to obtain a photochromic laminated sheet. The obtained photochromic laminated sheet was evaluated for photochromic properties in the same manner as in Example 1 and for moldability in the same manner as in Example 11. The results are shown in Table 11.

Examples 48 and 49, Comparative Example 8

Photochromic laminated sheets were manufactured and evaluated in the same manner as in Example 47 except that the photochromic compositions shown in Table 10 were used. The results are shown in Table 11.

Example 50

A photochromic laminated sheet was manufactured and evaluated in the same manner as in Example 47 except that a polyurethane-urea resin (U1) was prepared without adding polyrotaxane (A) and polyrotaxane (A) was added to this polyurethane-urea resin (U1). The results are shown in Table 11.

TABLE 10

| No. | *1 | *2 | *3 | Component (C) (parts by mass) | Additive (parts by mass) | *4 |
|---|---|---|---|---|---|---|
| Ex. 47 | *5 | A-1(2) | PC1(0.3) | PL1(36)/IPDI(51)/IPDA(11) | DMF(300) HALS(0.5) IPA(400) | — |
| Ex. 48 | *5 | A-1(4) | PC1(0.3) | PL1(34)/IPDI(51)/IPDA(11) | DMF(300) HALS(0.5) IPA(400) | — |

TABLE 10-continued

| No. | *1 | *2 | *3 | Component (C) (parts by mass) | Additive (parts by mass) | *4 |
|---|---|---|---|---|---|---|
| Ex. 49 | *5 | A-4(2) | PC1(0.3) | PL1(36)/IPDI(51)/IPDA(11) | DMF(300) HALS(0.5) IPA(400) | — |
| Ex. 50 | *5 | A-10(2) | PC1(0.3) | PL1(36)/IPDI(51)/IPDA(11) | DMF(300) HALS(0.5) IPA(400) | — |
| Comp. Ex. 8 | *5 | — | PC1(0.3) | PL1(38)/IPDI(51)/IPDA(11) | DMF(300) HALS(0.5) IPA(400) | — |

*1: Molding method,
*2: Component (A) (parts by mass),
*3: Component (B) (parts by mass),
*4: Initiator (parts by mass),
*5: Binder method

TABLE 11

| No. | *1 | *2 | *3 | *4 |
|---|---|---|---|---|
| Ex. 47 | 590 | 0.95 | 54 | 1 |
| Ex. 48 | 591 | 1.03 | 48 | 1 |
| Ex. 49 | 591 | 0.98 | 52 | 1 |
| Ex. 20 | 590 | 0.98 | 49 | 1 |
| Comp. Ex. 8 | 590 | 0.85 | 62 | 1 |

*1: Maximum absorption wavelength (λmax),
*2: Color optical density,
*3: Ading speed (sec),
*4: Moldability Example 51

Components were mixed together according to the following formulation to prepare a mixed solution.
Formulation:
  Polyrotaxane (A): 5 parts by mass of (A-5)
  Polymerizable monomers (C): 45 parts by mass of BPE500
    4 parts by mass of A-BPE
    4 parts by mass of 14G
    8 parts by mass of A400
    29 parts by mass of TMPT
    1 part by mass of GMA
    1 part by mass of αMS
  Other compounding agent (additive): 0.1 part by mass of HALS (stabilizer)

0.16 part by mass of PC1 was added as a photochromic compound (B) to the obtained mixed solution and fully stirred to be dissolved.

Thereafter, 3 parts by mass of MOI as a polymerizable monomer (C) and 1.5 parts by mass of Perbutyl ND (thermal polymerization initiator) and 0.1 part by mass of Perocta O (thermal polymerization initiator) as other compounding agents (additives) were fully mixed with the above solution to obtain a photochromic composition. The amounts of these components (composition of photochromic composition) are shown in Table 12.

A photochromic cured body was manufactured from the obtained photochromic composition by the cast polymerization of the lamination method.

That is, the obtained photochromic composition was injected into the cavity of a lens molding mold in which an adhesive tape was wound around the side faces of glass molds and a plastic lens substrate (CR39 lens) and polymerized.

The plastic lens substrate (CR39) was degreased with acetone completely and subjected to an ultrasonic alkali treatment with a 20% sodium hydroxide aqueous solution at 60° C. for 10 minutes to manufacture a casting mold.

The photochromic composition was polymerized in an air furnace and thermally cured by gradually raising the temperature from 30° C. to 95° C. over 18 hours. After the end of polymerization, the glass molds were removed to obtain a photochromic laminate comprising the photochromic cured body having a thickness of 0.5 mm adhered to the plastic lens substrate having a thickness of 2 mm.

The obtained photochromic laminate was evaluated for photochromic properties in the same manner as in Example 1 and for moldability in the same manner as in Example 11. The results are shown in Table 13.

Example 52, Comparative Example 9

Photochromic laminates were manufactured and evaluated in the same manner as in Example 51 except that the photochromic compositions shown in Table 12 were used. The results are shown in Table 13.

TABLE 12

| No. | *1 | *2 | *3 | Component (C) (parts by mass) | Additive (parts by mass) | Initiator (parts by mass) |
|---|---|---|---|---|---|---|
| Ex. 51 | *4 | A-5(5) | PC1(0.16) | BPE500(45)/A-BPE(4)/14G(4)/ A400(8)/TMPT(29)/GMA(1)/ αMS(1)/MOI(3) | HALS(0.1) | Perbutyl ND(1.5) Perocta O(0.1) |
| Ex. 52 | *4 | A-6(2) | PC1(0.16) | BPE500(38)/14G(6)/A400(15)/ TMPT(33)/GMA(1)/MOI(5) | HALS(0.1) | Perbutyl ND(1.5) Perocta O(0.1) |

TABLE 12-continued

| No. | *1 | *2 | *3 | Component (C) (parts by mass) | Additive (parts by mass) | Initiator (parts by mass) |
|---|---|---|---|---|---|---|
| Comp. Ex. 9 | *4 | — | PC1(0.16) | BPE500(50)/A-BPE(4)/14G(4)/ A400(8)/TMPT(29)/GMA(1)/ αMS(1)/MOI(3) | HALS(0.1) | Perbutyl ND(1.5) Perocta O(0.1) |

*1: Molding method,
*2: Component (A) (parts by mass),
*3: Component (B) (parts by mass),
*4: Lamination method

TABLE 13

| No. | *1 | *2 | *3 | *4 |
|---|---|---|---|---|
| Ex. 51 | 590 | 0.99 | 49 | 1 |
| Ex. 52 | 591 | 0.92 | 54 | 1 |
| Comp. Ex. 9 | 591 | 0.76 | 60 | 1 |

*1: Maximum absorption wavelength (λmax),
*2: Color optical density,
*3: Ading speed (sec),
*4: Moldability As obvious from the above Examples and Comparative Examples, cured bodies obtained by polymerizing the photochromic compositions of this invention are extremely excellent in photochromic properties.

Examples 1 to 10 have excellent photochromic properties and are superior to Comparative Example 1 in color optical density and fading speed.

Examples 11 to 38 have excellent photochromic properties and further well-balanced physical properties including hardness and cloudiness. Although Comparative Examples 2 and 3 have excellent lens properties such as hardness and cloudiness, photochromic properties are rarely developed.

It is understood from these that Examples 11 to 38 are extremely excellent in photochromic properties and lens properties.

Examples 39 to 43 also have excellent photochromic properties and further well-balanced physical properties including hardness and cloudiness. Although Comparative Examples 4 and 5 are equivalent to Examples 39 to 43 in terms of hardness and cloudiness, they are apparently inferior in color optical density and fading speed.

It is understood from these that Examples 39 to 43 are extremely excellent in photochromic properties and lens properties.

Examples 44 to 46 have excellent photochromic properties and are superior to Comparative Examples 6 and 7 in color optical density and fading speed.

Examples 47 to 50 have excellent photochromic properties and are superior to Comparative Example 8 in color optical density and fading speed.

Examples 51 and 52 have excellent photochromic properties and are superior to Comparative Example 9 in color optical density and fading speed.

EXPLANATION OF NUMERALS

1: polyrotaxane
2: axial molecule
3: cyclic molecule
4: bulky terminal group
5: side chain

The invention claimed is:

1. A photochromic composition comprising:
   (A) a polyrotaxane having a composite molecular structure comprising an axial molecule and a plurality of cyclic molecules clathrating the axial molecule; and
   (B) a photochromic compound, which is at least one compound selected from the group consisting of a fulgide compound, a spirooxazine compound, and a chromene compound.

2. The photochromic composition according to claim 1, wherein a ring contained in each of the cyclic molecules of the polyrotaxane (A) is a cyclodextrin ring.

3. The photochromic composition according to claim 1, wherein the axial molecule passing through rings of the cyclic molecules has a chain structure having a bulky group at both ends, the chain part is formed of polyethylene glycol, and the bulky group at both ends is an adamantyl group.

4. The photochromic composition according to claim 1, wherein, when the maximum number of the cyclic molecules clathrating one axial molecule is 1, the number of clathrating cyclic molecules contained in the polyrotaxane (A) is 0.001 to 0.6.

5. The photochromic composition according to claim 1, wherein a side chain is introduced into at least part of a ring contained in each of the cyclic molecules.

6. The photochromic composition according to claim 5, wherein the side chain is organic chains having 3 to 20 carbon atoms that are coupled together.

7. The photochromic composition according to claim 5, wherein the side chain is introduced into not less than 6% of the total number of all the functional groups of the ring.

8. The photochromic composition according to claim 5, wherein a polymerizable functional group is introduced into the side chain.

9. The photochromic composition according to claim 8, wherein the polymerizable functional group is a radically polymerizable group, epoxy group, OH group, SH group, $NH_2$ group, episulfide group, thietanyl group, NCO group or NCS group.

10. The photochromic composition according to claim 1 which further comprises (C) a polymerizable monomer.

11. The photochromic composition according to claim 10 which comprises the photochromic compound (B) in an amount of 0.0001 to 10 parts by mass based on 100 parts by mass as the total amount of the polyrotaxane (A) and the polymerizable monomer (C).

12. The photochromic composition according to claim 10 which further comprises (D) a polymerization-curing accelerator.

13. A photochromic cured body obtained by curing the photochromic composition of claim 10.

14. A photochromic laminate having a layer comprising the photochromic cured body of claim 13 on the surface of an optical substrate.

15. A photochromic laminated sheet obtained by bonding together two opposed transparent sheets by means of an adhesive layer comprising the photochromic cured body of claim 13.

16. The photochromic composition according to claim 1, wherein the photochromic compound (B) is a chromene compound having an indeno[2,1-f]naphtho[1,2-b]pyran skeleton and a molecular weight of not less than 540.

17. The photochromic composition according to claim 10, wherein the polyrotaxane (A) and the polymerizable monomer are used at a mass ratio of polyrotaxane (A): polymerizable monomer=0.1:99.9 to 50.0:50.0.

* * * * *